US011580982B1

(12) United States Patent
Karnawat et al.

(10) Patent No.: US 11,580,982 B1
(45) Date of Patent: Feb. 14, 2023

(54) RECEIVING VOICE SAMPLES FROM LISTENERS OF MEDIA PROGRAMS

(71) Applicant: Amazon Technologies, Inc., Seattle, WA (US)

(72) Inventors: Rakshit Karnawat, Seattle, WA (US); Sanjeev Kumar, Redmond, WA (US); William Jeffrey Lett, Atlanta, GA (US); Maharshi N. Patel, Marietta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 17/330,321

(22) Filed: May 25, 2021

(51) Int. Cl.
*G06F 3/048* (2013.01)
*G10L 15/22* (2006.01)
*H04L 65/1069* (2022.01)
*G06F 3/0482* (2013.01)

(52) U.S. Cl.
CPC ............ *G10L 15/22* (2013.01); *G06F 3/0482* (2013.01); *H04L 65/1069* (2013.01)

(58) Field of Classification Search
CPC .... G10L 15/22; G06F 3/0482; H04L 65/1069
See application file for complete search history.

(56) References Cited

U.S. PATENT DOCUMENTS

| 8,023,800 | B2 | 9/2011 | Concotelli |
| 8,560,683 | B2 | 10/2013 | Funk et al. |
| 8,572,243 | B2 | 10/2013 | Funk et al. |
| 8,768,782 | B1 | 7/2014 | Myslinski |
| 9,003,032 | B2 | 4/2015 | Funk et al. |
| 9,369,740 | B1 | 6/2016 | Funk et al. |
| 9,706,253 | B1 | 7/2017 | Funk et al. |
| 9,729,596 | B2 | 8/2017 | Sanghavi et al. |
| 9,781,491 | B2 | 10/2017 | Wilson |

(Continued)

FOREIGN PATENT DOCUMENTS

| AU | 2013204532 B2 | 11/2014 |
| CA | 2977959 A1 | 9/2016 |

(Continued)

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

(Continued)

*Primary Examiner* — William C Trapanese
(74) *Attorney, Agent, or Firm* — Athorus, PLLC

(57) ABSTRACT

Listeners to media programs provide feedback to creators or other entities associated with the media programs in the form of one or more spoken utterances. When a listener to a media program speaks one or more words to a microphone or other system, the words are captured and processed to determine an emotion of the listener, or to determine whether the words include any objectionable content. Data including the spoken words is captured and stored, and presented to the creator of the media program. Notifications of the utterances are provided to the creator, who may identify one of the utterances, and include the utterance in the media program, or invite the listener who provided the utterances to participate in the media program.

20 Claims, 22 Drawing Sheets

(56) References Cited

U.S. PATENT DOCUMENTS

| | | |
|---|---|---|
| 9,872,069 B1 | 1/2018 | Funk et al. |
| 10,091,547 B2 | 10/2018 | Sheppard et al. |
| 10,110,952 B1 | 10/2018 | Gupta et al. |
| 10,135,887 B1 | 11/2018 | Esser et al. |
| 10,140,364 B1 | 11/2018 | Diamondstein |
| 10,178,442 B2 | 1/2019 | Shkedi |
| 10,313,726 B2 | 6/2019 | Woods et al. |
| 10,356,476 B2 | 7/2019 | Dharmaji |
| 10,432,335 B2 | 10/2019 | Bretherton |
| 10,489,395 B2 | 11/2019 | Lakkur et al. |
| 10,685,050 B2 | 6/2020 | Krishna et al. |
| 10,698,906 B2 | 6/2020 | Hargreaves et al. |
| 10,719,837 B2 | 7/2020 | Kolowich et al. |
| 10,769,678 B2 | 9/2020 | Li |
| 10,846,330 B2 | 11/2020 | Shilo |
| 10,985,853 B2 | 4/2021 | Bretherton |
| 10,986,064 B2 | 4/2021 | Siegel et al. |
| 10,997,240 B1 | 5/2021 | Aschner et al. |
| 11,451,863 B1 | 9/2022 | Benjamin et al. |
| 2002/0042920 A1 | 4/2002 | Thomas et al. |
| 2002/0056087 A1 | 5/2002 | Berezowski et al. |
| 2006/0268667 A1 | 11/2006 | Jellison et al. |
| 2007/0124756 A1 | 5/2007 | Covell et al. |
| 2007/0271518 A1 | 11/2007 | Tischer et al. |
| 2007/0271580 A1 | 11/2007 | Tischer et al. |
| 2008/0086742 A1 | 4/2008 | Aldrey et al. |
| 2009/0044217 A1 | 2/2009 | Lutterbach et al. |
| 2009/0076917 A1 | 3/2009 | Jablokov et al. |
| 2010/0088187 A1 | 4/2010 | Courtney et al. |
| 2011/0067044 A1 | 3/2011 | Albo |
| 2012/0191774 A1 | 7/2012 | Bhaskaran et al. |
| 2012/0304206 A1 | 11/2012 | Roberts et al. |
| 2012/0311618 A1 | 12/2012 | Blaxland |
| 2012/0331168 A1 | 12/2012 | Chen |
| 2013/0074109 A1 | 3/2013 | Skelton et al. |
| 2013/0247081 A1 | 9/2013 | Vinson et al. |
| 2014/0019225 A1 | 1/2014 | Guminy et al. |
| 2014/0040494 A1 | 2/2014 | Deinhard et al. |
| 2014/0068432 A1* | 3/2014 | Kucharz ............ G06Q 10/107 715/716 |
| 2014/0108531 A1 | 4/2014 | Klau |
| 2014/0123191 A1 | 5/2014 | Hahn et al. |
| 2014/0228010 A1* | 8/2014 | Barbulescu ............ H04L 51/10 455/414.4 |
| 2014/0325557 A1 | 10/2014 | Evans et al. |
| 2014/0372179 A1 | 12/2014 | Ju et al. |
| 2015/0163184 A1 | 6/2015 | Kanter et al. |
| 2015/0248798 A1 | 9/2015 | Howe et al. |
| 2015/0289021 A1 | 10/2015 | Miles |
| 2015/0319472 A1 | 11/2015 | Kotecha et al. |
| 2016/0188728 A1 | 6/2016 | Gill et al. |
| 2016/0266781 A1 | 9/2016 | Dandu et al. |
| 2016/0330529 A1 | 11/2016 | Byers |
| 2017/0127136 A1 | 5/2017 | Roberts et al. |
| 2017/0289617 A1 | 10/2017 | Song et al. |
| 2018/0025078 A1 | 1/2018 | Quennesson |
| 2018/0035142 A1 | 2/2018 | Rao et al. |
| 2018/0205797 A1 | 7/2018 | Faulkner |
| 2018/0255114 A1 | 9/2018 | Dharmaji |
| 2018/0322411 A1 | 11/2018 | Wang et al. |
| 2019/0065610 A1 | 2/2019 | Singh |
| 2019/0132636 A1 | 5/2019 | Gupta et al. |
| 2019/0171762 A1 | 6/2019 | Luke et al. |
| 2019/0327103 A1 | 10/2019 | Niekrasz |
| 2019/0385600 A1 | 12/2019 | Kim |
| 2021/0104245 A1 | 4/2021 | Alas et al. |
| 2021/0105149 A1 | 4/2021 | Roedel et al. |
| 2021/0210102 A1 | 7/2021 | Huh et al. |
| 2021/0232577 A1 | 7/2021 | Ogawa et al. |
| 2021/0256086 A1 | 8/2021 | Askarian et al. |
| 2021/0366462 A1 | 11/2021 | Yang et al. |
| 2022/0038783 A1 | 2/2022 | Wee |
| 2022/0223286 A1 | 7/2022 | Lach et al. |
| 2022/0254348 A1 | 8/2022 | Tay et al. |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

\* cited by examiner

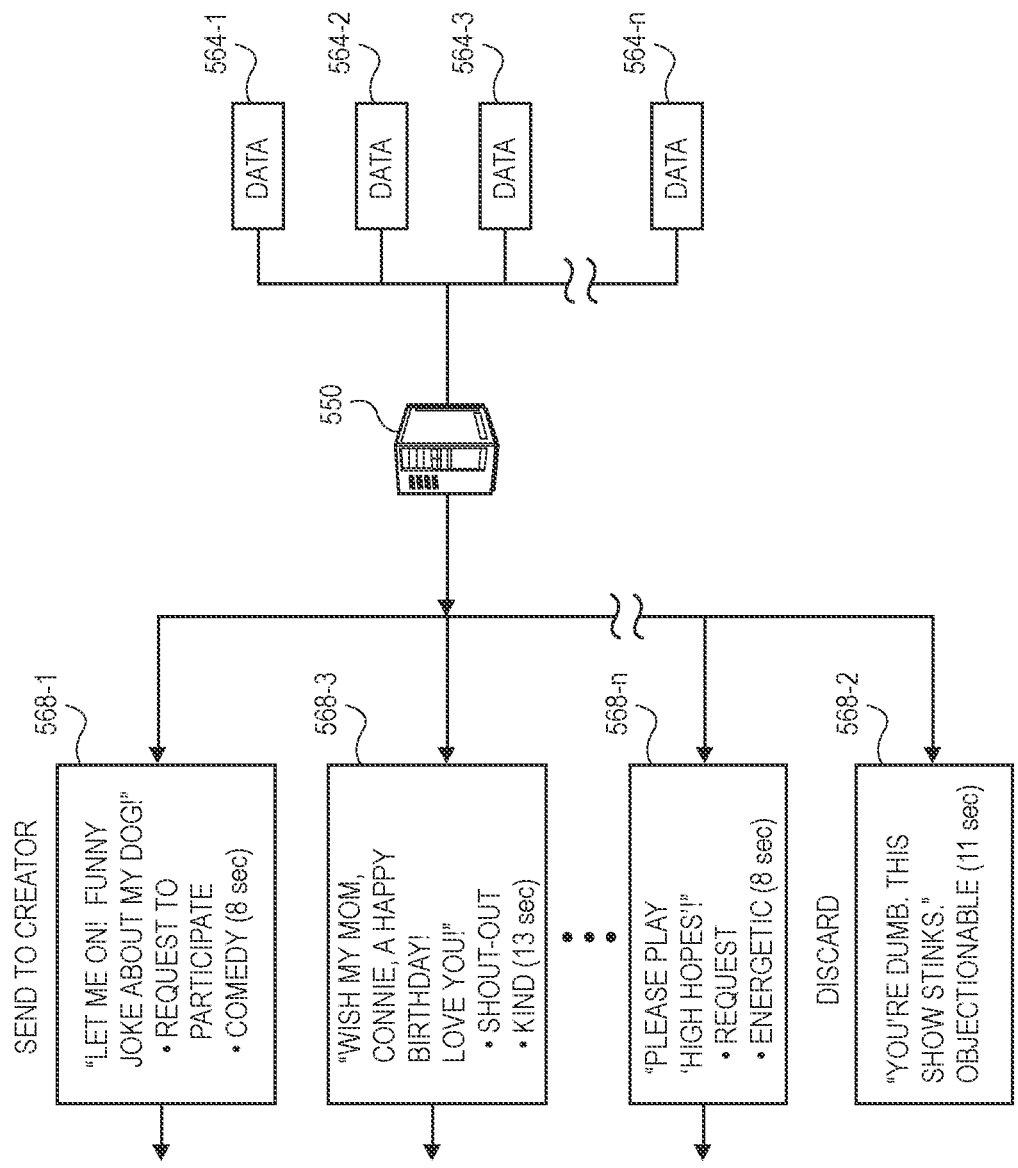

RECEIVING VOICE SAMPLES FROM LISTENERS OF MEDIA PROGRAMS

BACKGROUND

Not long after the advent of the commercial radio industry in the United States, "talk" radio shows began to emerge as an attractive and engaging platform for communication. In talk radio, hosts speak directly to listeners, typically on a casual or informal basis, to convey information or express opinions on various topics. By the 1940s, call-in (or "phone-in") radio shows allowed listeners to contact a radio station, typically by telephone, and to participate in a radio show. Over time, call-in radio shows enabled users to provide information or express their opinions, which may coincide or conflict with those of a host, to request a musical selection to be played by the host, or to otherwise participate in the radio show in any other manner.

While a call-in radio format is both valuable and effective for many reasons, the format is subject to a number of limitations. First, producing a call-in radio show typically requires additional telephone systems or services, and personnel, to receive telephone calls from listeners, and to coordinate connecting the listeners with the hosts while the radio show is on the air. Next, call-in radio shows are commonly subject to the limitations of such systems or services to connect listeners to hosts. For example, where many listeners are interested in connecting with a radio show by telephone, such as to request a song, or to respond to a promotion, a host must typically select a listener from a numbered or ranked list of listeners who call into the radio show, e.g., "caller number five," and connect with that selected listener, without connecting with or contacting any of the listeners that preceded or followed the selected listener in the numbered or ranked list. Moreover, producers of radio shows are currently unable to determine or predict an emotional state of a listener who intends to participate in a radio show, or to determine whether that listener intends to share objectionable content (e.g., obscene, indecent, profane or divisive words or other content) with the host or other listeners of the radio show, until that listener ultimately appears on the air.

BRIEF DESCRIPTION OF THE DRAWINGS

FIGS. 5A through 5E are views of aspects of one system for receiving voice samples in accordance with embodiments of the present disclosure.

DETAILED DESCRIPTION

As is set forth in greater detail below, the present disclosure is directed to systems and methods for receiving voice samples from listeners (e.g., subscribers) of media programs, such as media programs that are broadcast to systems or devices over computer networks, such as the Internet. More specifically, the systems and methods of the present disclosure are directed to enabling listeners to media programs to provide one or more voice samples, utterances or other sets of words to devices having one or more microphones or other acoustic sensors, e.g., including but not limited to mobile devices such as smartphones, tablet computers or laptop computers, as well as smart speakers or any other systems or devices. Data representing the voice samples may be transmitted to a broadcast system (or broadcast control system) and processed to transcribe the voice samples, to determine emotional states of a listeners that provided the voice samples, or to otherwise determine whether the voice samples contain objectionable content. A title or a summary of the data may be determined, such as from a transcript of a voice sample represented in the data, and the data may be stored in one or more data stores, indexed by or associated with the title.

Subsequently, one or more notifications or other information regarding voice samples received from listeners or subscribers to a media program may be provided to a creator of the media program, e.g., via user interfaces presented on computer systems or devices associated with the media program. The creator may then select one of the voice samples, and elect to include the voice sample within the media program, to play a media selection identified in the voice sample, to invite the listener or subscriber who provided the voice sample to participate in the media program, or to take any other action associated with the listener or the voice sample.

Figure 1A:
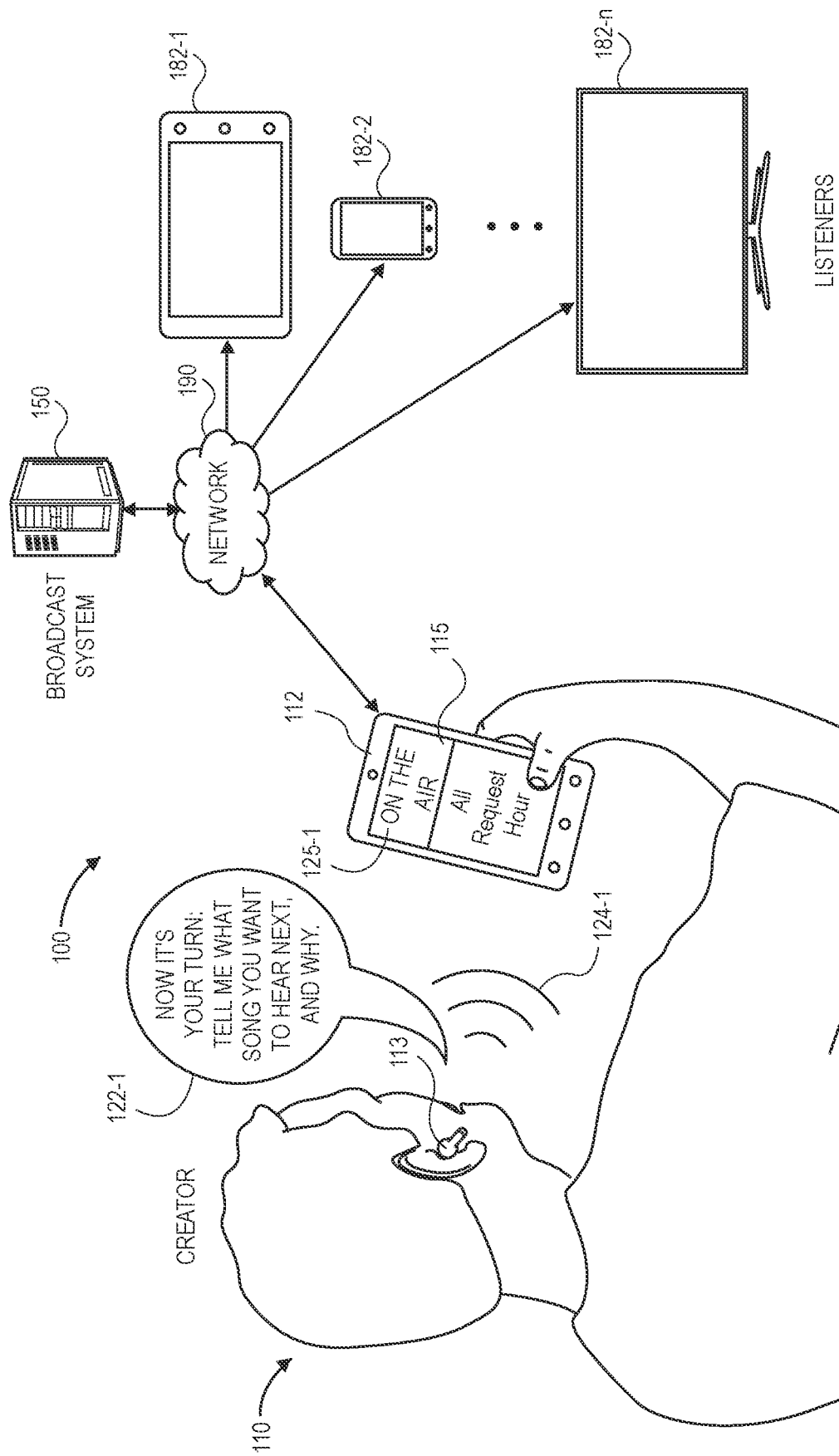
FIGS. 1A through 1E are views of aspects of one system for receiving voice samples in accordance with embodiments of the present disclosure.

Referring to FIGS. 1A through 1E, views of aspects of one system for receiving voice samples in accordance with embodiments of the present disclosure are shown. As is shown in FIG. 1A, a system 100 includes a mobile device 112 (e.g., a smartphone, a tablet computer, a laptop computer, or any other system or device) of a creator 110 (e.g., a user, or a host), a broadcast system 150 (e.g., one or more servers or other computer systems) and a plurality of computer devices 182-1, 182-2 . . . 182-n or other systems of any number n of listeners (or subscribers) that are connected to one another over one or more networks 190, which may include the Internet in whole or in part. The creator 110 wears one or more ear buds 113 (or ear phones, or head phones) or other communication systems or devices which may be in communication with the mobile device 112, and may exchange (e.g., transfer or receive) data relating to audio signals or any other data with the mobile device 112. The computer device 182-1 is a tablet computer or like system. The computer device 182-2 is a smartphone or like system. The computer device 182-n is a television or like system. However, the computer systems or devices that may be operated or utilized in accordance with the present disclosure are not limited by any of the devices or systems shown in FIG. 1A.

As is shown in FIG. 1A, the mobile device 112 includes a display 115 (e.g., a touchscreen) having a user interface 125-1 rendered thereon. The user interface 125-1 may include one or more interactive or selectable elements or features that enable the creator 110 to construct a media program from one or more sets of media content, or to control the transmission or receipt of media content in accordance with the media program, e.g., by the broadcast system 150 or from any other source, to the computer devices 182-1, 182-2 . . . 182-n over the networks 190. In some implementations, the broadcast system 150 may establish a two-way or bidirectional channel or connection with the mobile device 112, and one-way or unidirectional channels or connections with the devices 182-1, 182-2 . . . 182-n. In some other implementations, the broadcast system 150 may establish two-way or bidirectional channels with the mobile device 112, and any number of the devices 182-1, 182-2 . . . 182-n.

In some implementations, the display 115 may be a capacitive touchscreen, a resistive touchscreen, or any other system for receiving interactions by the creator 110. Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, the ear buds 113, or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to the creator 110 or to receive interactions from the creator 110 via the display 115.

As is further shown in FIG. 1A, the creator 110 provides an utterance 122-1 of one or more words that are intended to be heard by one or more listeners using the computer devices 182-1, 182-2 . . . 182-n. In particular, the creator 110 invites such listeners to provide him with requests or recommendations of songs to be played during the media program, viz., "Now it's your turn: tell me what song you want to hear, and why," in accordance with a broadcast plan for the media program or spontaneously. The mobile device 112 and/or the ear buds 113 may capture acoustic data 124-1 representing the utterance 122-1 of the creator 110, and transmit the data 124-1 to the broadcast system 150 over the one or more networks 190. The broadcast system 150 may then cause data, e.g., some or all of the data 124-1 to be transmitted to one or more computer systems or devices of listeners over one or more networks 190, in order to present the invitation of the creator 110 to such listeners.

In some implementations, the user interfaces of the present disclosure (viz., the user interface 125-1, or others) may include one or more features enabling the creator 110 to exercise control over the media content being played by the devices 182-1, 182-2 . . . 182-n of the listeners. For example, such features may enable the creator 110 to manipulate a volume or another attribute or parameter (e.g., treble, bass, or others) of audio signals represented in data transmitted to the respective devices 182-1, 182-2 . . . 182-n of the listeners by one or more gestures or other interactions with a user interface rendered on the mobile device 112. In response to instructions received from the mobile device 112 by such gestures or interactions, the broadcast system 150 may modify the data transmitted to the respective devices 182-1, 182-2 . . . 182-n of the listeners accordingly.

Alternatively, or additionally, the user interfaces of the present disclosure may include one or more elements or features for playing, pausing, stopping, rewinding or fast-forwarding media content to be represented in data transmitted to the respective devices 182-1, 182-2 . . . 182-n. For example, the user interfaces may further include one or more elements or features for initiating a playing of any type or form of media content from any source, and the broadcast system 150 may establish or terminate channels or connections with such sources, as necessary, or modify data transmitted to the respective devices 182-1, 182-2 . . . 182-n of the listeners to adjust audio signals played by such devices, in response to gestures or other interactions with such elements or features. The user interfaces may further include any visual cues such as "on the air!" or other indicators as to media content that is currently being played, and from which source, as well as one or more clocks, timers or other representations of durations for which media content has been played, times remaining until the playing of media content is expected to end or be terminated, or times at which other media content is to be played.

Figure 1B:
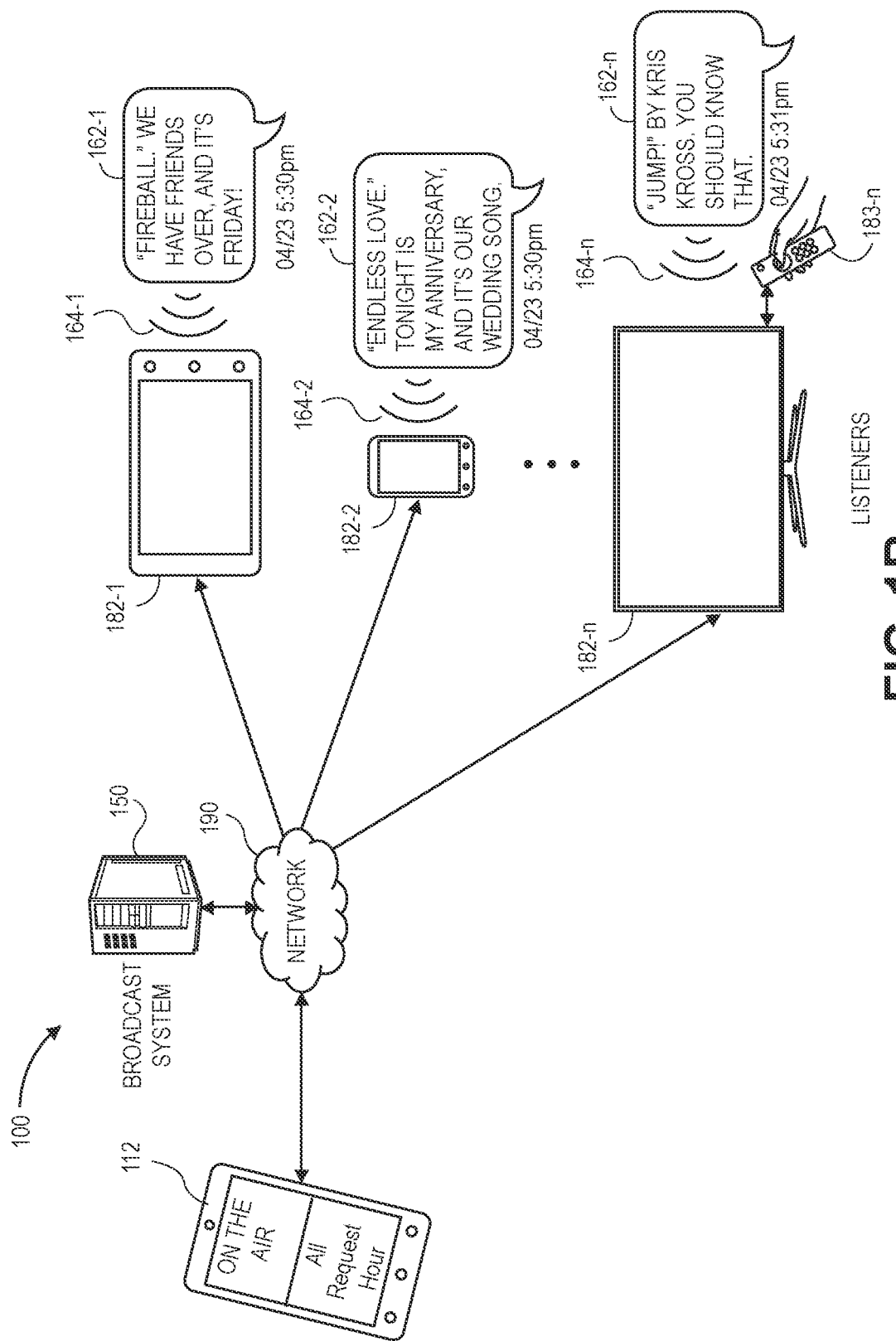

As is shown in FIG. 1B, upon receiving the data 124-1 from the broadcast system 150, the computer devices 182-1, 182-2 . . . 182-n may present media content including the utterance 122-1, viz., the invitation to the listeners, and capture acoustic data representing responses to the invitation from such listeners. In particular, as is shown in FIG. 1B, a listener to the device 182-1 responds with a voice sample (e.g., an utterance) 162-1, "'Fireball.' We have friends over and it's Friday." The device 182-1 captures data 164-1 representing the voice sample 162-1, and transmits the data 164-1 and any other metadata, e.g., a date or a time at which the data 164-1 was captured, to the mobile device 112 or the broadcast system 150 over the one or more networks 190. Likewise, a listener to the device 182-2 responds with a voice sample 162-2, "'Endless Love.' Tonight is my anniversary, and it's our wedding song." The device 182-2 captures data 164-2 representing the voice sample 162-2, and transmits the data 164-2 and any other metadata to the mobile device 112 or the broadcast system 150 over the one or more networks 190. Also, a listener to the device 182-n responds with a voice sample 162-n, "'Jump!' by Kris Kross. You should know that." An auxiliary device 183-n (e.g., a voice-enabled remote control) associated with the device 182-n captures data 164-n representing the voice sample 162-n, and transmits the data 164-n to the device 182-n, which transmits the data and any other metadata to the mobile device 112 or the broadcast system 150 over the one or more networks 190. Alternatively, or additionally, any number of the n listeners who heard the invitation may provide utterances in response to the invitation for requests or recommendations, or decline to provide any such utterances. The number of listeners that subscribe to a media program, or receive audio signals from the creator 110 or the broadcast system 150 and provide voice samples or other feedback in response to the invitation of the creator 110, may be any number, such as several, dozens, hundreds, thousands or more listeners.

Figure 1C:
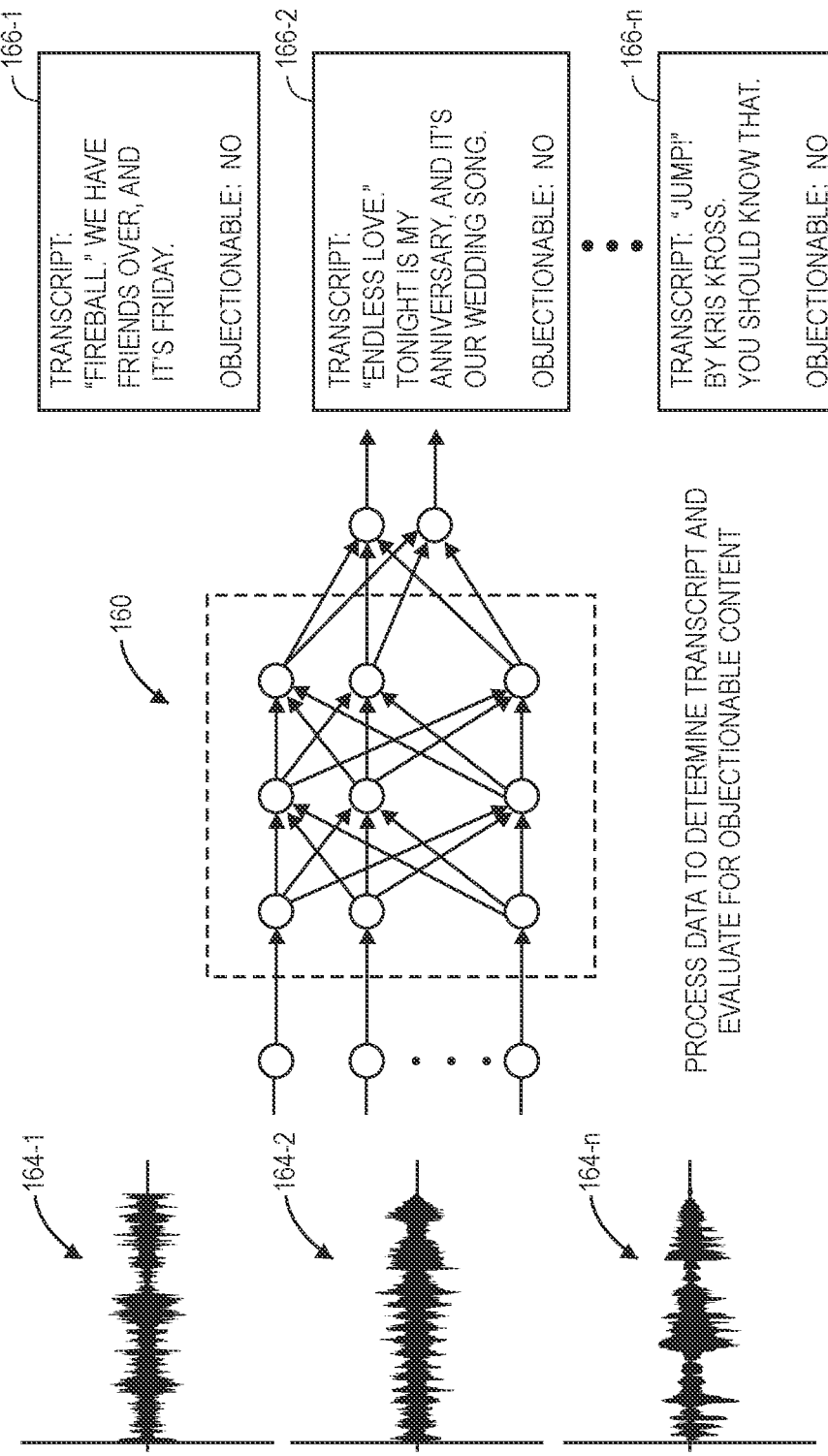

In accordance with implementations of the present disclosure, data representing voice samples or utterances of the listeners may be processed to transcribe such voice samples or utterances, to determine any sentiments of the listeners or the utterances, to determine whether any of the voice samples or utterances include objectionable (e.g., obscene, indecent, profane or divisive) content, or to determine any other attributes of the voice samples or utterances. As is shown in FIG. 1C, the data 164-1, 164-2 . . . 164-*n* representing the voice samples 162-1, 162-2 . . . 162-*n* shown in FIG. 1B is provided as inputs to a machine learning algorithm 160 (e.g., an artificial neural network). The machine learning algorithm 160 may be trained to identify any words represented in the data 164-1, 164-2 . . . 164-*n*, or to determine whether any of such words include or constitute objectionable content. Alternatively, in some implementations, the machine learning algorithm 160 may be trained to identify any media content (e.g., one or more artists, genres, moods, playlists, podcasts, songs, videos or others) described by the words represented in the data 164-1, 164-2 . . . 164-*n*. In some implementations, the machine learning algorithm 160 may be trained to identify any context features embodied in the data 164-1, 164-2 . . . 164-*n* (e.g., any goals associated with the voice samples 162-1, 162-2 . . . 162-*n*, or any frequencies or wavelengths, intensities, durations of sounds, numbers of arguments, or other descriptors), or to determine a time, a date or a location from which the voice sample 162-1 was provided to the device 182-1.

Alternatively, or additionally, other types of machine learning algorithms, systems or techniques, or multiple machine learning algorithms, systems or techniques, may be utilized to transcribe voice samples (or utterances), determine sentiments, evaluate voice samples for objectionable content, or determine any other attributes of the voice samples. Moreover, in some implementations, whether a voice sample or utterance includes any objectionable content may be determined in any other manner, including but not limited by one or more algorithms, systems or techniques that need not rely on machine learning or like applications. For example, in some implementations, a set of words that has been identified and designated as objectionable in nature, e.g., words that are known to be or are designated as either obscene, indecent, profane or divisive. When a set of words is identified from a voice sample received from a listener, one or more of the words may be compared to a set of words that has been identified and designated as objectionable in nature. In some implementations, whether a set of words identified in a voice sample is objectionable may be determined based on a number of words in the set of words that have been identified and designated as objectionable in nature.

As is shown in FIG. 1C, in response to the data 164-1, 164-2 . . . 164-*n*, information (or data) 166-1, 166-2 . . . 166-*n* such as transcripts of the voice samples 162-1, 162-2 . . . 162-*n* or an indication as to whether any of the voice samples 162-1, 162-2 . . . 162-*n* includes objectionable content is identified based on outputs received from the machine learning algorithm 160. Alternatively, or additionally, the information 166-1, 166-2 . . . 166-*n* may also include identifiers of any media content (e.g., artists, genres, moods, playlists, podcasts, songs, videos or others) described in any of the voice samples 162-1, 162-2 . . . 162-*n* determined based on outputs received from the machine learning algorithm 160, or any other information, data or metadata. In some implementations, the information 166-1, 166-2 . . . 166-*n* may include a year during which the media content was first released, a producer or label affiliated with the media content, or a duration of the media content, may be identified from the voice sample 162-1 or from one or more external sources.

In some implementations, the data 164-1, 162-2 . . . 164-*n* representing the voice samples 162-1, 162-2 . . . 162-*n* or the information 166-1, 166-2 . . . 166-*n* may be stored in one or more data stores, e.g., by the broadcast system 150 or any other system. For example, in some implementations, a title or other descriptor of the data 164-1, 162-2 . . . 164-*n* or the voice samples 162-1, 162-2 . . . 162-*n* may be determined from a transcript of the voice samples 162-1, 162-2 . . . 162-*n*, and the data 164-1, 162-2 . . . 164-*n* may be stored in association with the voice samples 162-1, 162-2 . . . 162-*n*, along with any other information or data, such as identifiers of listeners that provided the voice samples 162-1, 162-2 . . . 162-*n*, dates or times on which the voice samples 162-1, 162-2 . . . 162-*n* were provided, or any other descriptors of the voice samples 162-1, 162-2 . . . 162-*n*, e.g., whether the voice samples include objectionable content or any media content identified in such samples.

Alternatively, or additionally, in some implementations, whether any of the voice samples 162-1, 162-2 . . . 162-*n* includes objectionable content may be determined based on the outputs received from the machine learning algorithm 160 directly, or by further processing a transcript of words determined based on the output. Furthermore, in some implementations, words may be identified within the data representing the voice samples 162-1, 162-2 . . . 162-*n* to varying degrees of confidence or probability, which may be represented in one or more levels or scores. Likewise, whether such voice samples 162-1, 162-2 . . . 162-*n* include objectionable content, or identify media content, may also be determined to varying degrees of confidence or probability, which may also be represented in one or more levels or scores.

Figure 1D:
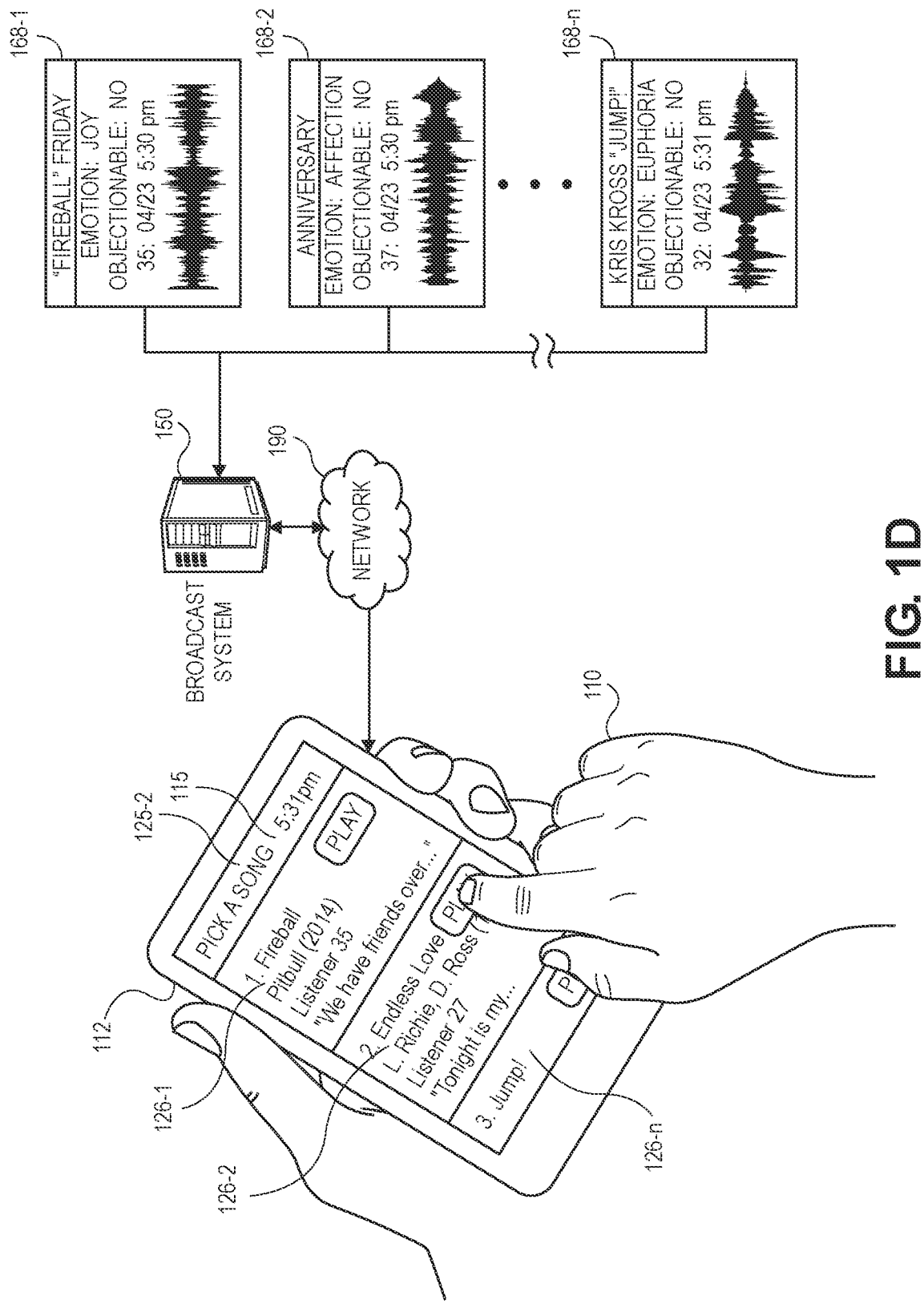

As is shown in FIG. 1D, after the information 166-1, 166-2 . . . 166-*n* received from the devices 182-1, 182-2 . . . 182-*n* of the n listeners is provided to the machine learning algorithm 160 as inputs, and outputs are received from the machine learning algorithm 160 in response to the inputs, information (or data) 168-1, 168-2 . . . 168-*n* regarding the voice samples 162-1, 162-2 . . . 162-*n* is provided to the mobile device 112 of the creator 110 over the one or more networks 190. As is shown in FIG. 1D, the information 168-1, 168-2 . . . 168-*n* may include titles (or summaries) of the voice samples 162-1, 162-2 . . . 162-*n*, and words (or transcripts of such words) of the voice samples 162-1, 162-2 . . . 162-*n*, as well as whether such words include objectionable content or identify any media content. As is further shown in FIG. 1D, the information 168-1, 168-2 . . . 168-*n* may include some or all of the information 166-1, 166-2 . . . 166-*n*, as well as any other metadata (e.g., identifiers of the listeners that provided the voice samples 162-1, 162-2 . . . 162-*n*, dates or times at which the voice samples 162-1, 162-2 . . . 162-*n* were provided, or others).

Subsequently, one or more notifications 126-1, 126-2 . . . 126-*n* or other elements identifying the voice samples 162-1, 162-2 . . . 162-*n* are presented in a user interface 125-2 on the display 115. For example, and as is shown in FIG. 1D, the notifications 126-1, 126-2 . . . 126-*n* include titles or other descriptors of each of the voice samples 162-1, 162-2 . . . 162-*n*, identifiers of listeners that provided each of the voice samples 162-1, 162-2 . . . 162-*n*, as well as representative words of each of the voice samples 162-1, 162-2 . . . 162-*n*, or identifiers of any media content (e.g., artists, genres, moods, playlists, podcasts, songs, videos or others) identified in each of the voice samples 162-1, 162-2 . . . 162-n.

As is also shown in FIG. 1D, the user interface 125-2 further includes one or more selectable features (e.g., a button) that may be activated to initiate one or more applications or perform one or more functions regarding each of the voice samples 162-1, 162-2 . . . 162-n. For example, as is further shown in FIG. 1D, the notifications 126-1, 126-2 . . . 126-n include selectable features for playing media content identified in each of the voice samples 162-1, 162-2 . . . 162-n. Alternatively, in some implementations, user interfaces rendered on computer devices or systems of the creator 110 may be configured to enable the creator 110 to play one of the voice samples 162-1, 162-2 . . . 162-n, or initiate a two-way connection with a device or system of a listener that provided one of the voice samples 162-1, 162-2 . . . 162-n, thereby enabling the listener to participate in the media program. In some implementations, the user interfaces may enable the creator 110 to take any other action regarding any of the voice samples 162-1, 162-2 . . . 162-n.

In some implementations, information regarding each of the voice samples 162-1, 162-2 . . . 162-n received from the devices 182-1, 182-2 . . . 182-n may be presented on the user interface 125-2. Alternatively, in some implementations, information regarding a subset of such voice samples, e.g., only the voice samples that are confirmed to not include any objectionable content, may be transmitted to the mobile device 112 and presented on the user interface 125-2.

Figure 1E:
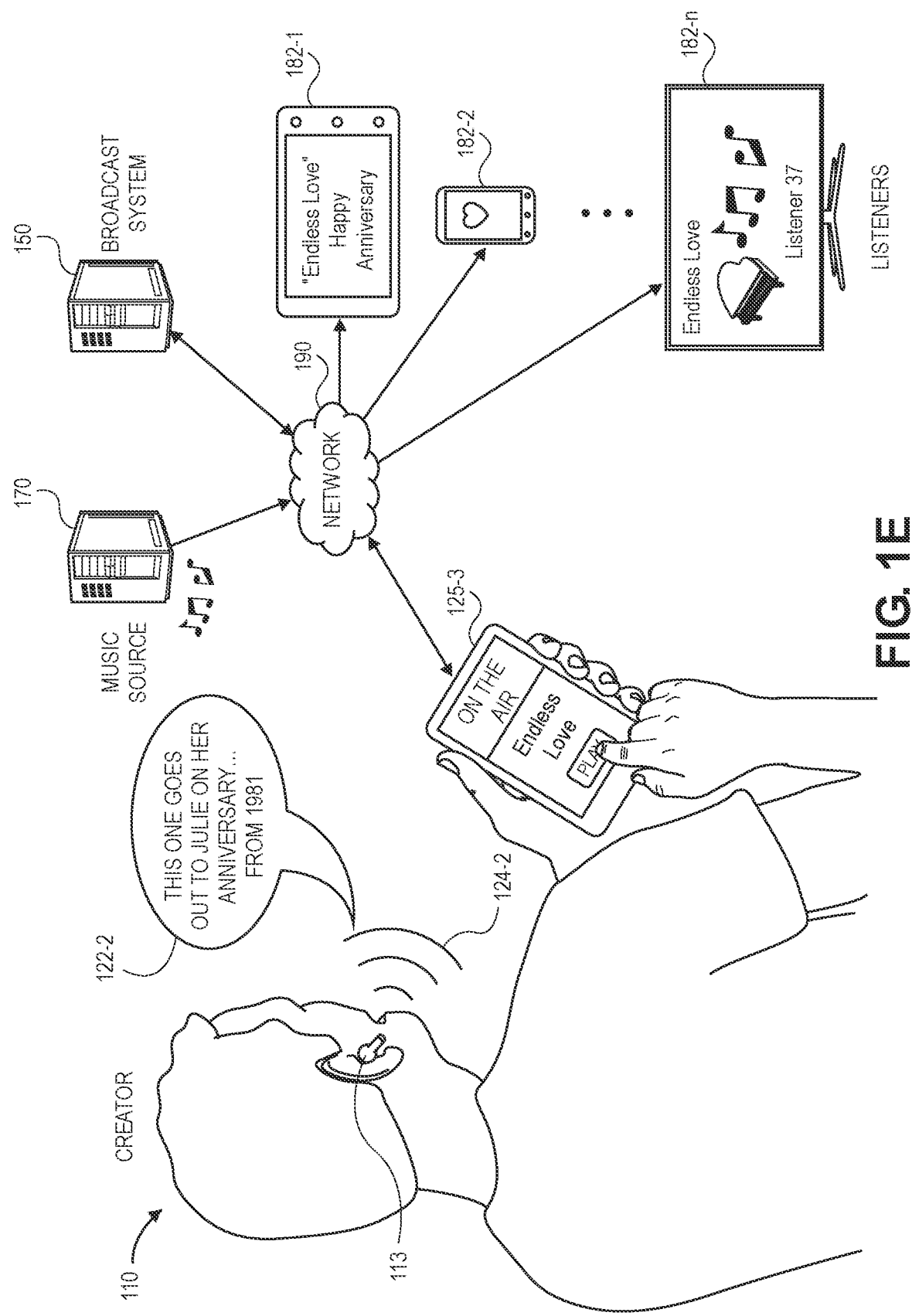

As is shown in FIG. 1E, upon receiving an interaction with or other selection of one of the notifications 126-1, 126-2 . . . 126-n, viz., an activation of a selectable feature for playing media content, the broadcast system 150 transmits data for playing the media content described in the one of the notifications 126-1, 126-2 . . . 126-n interacted with or selected to each of the devices 182-1, 182-2 . . . 182-n, e.g., from one or more computer systems or devices associated with a music source 170. Additionally, as is also shown in FIG. 1E, the creator 110 may provide one or more additional or supplemental utterances 122-2 concurrently with the activation of the selectable feature or the playing of the media content, and data 124-2 representing the utterances 122-2 that is captured by the mobile device 112 or the ear buds 113 is also transmitted to the broadcast system 150, and to each of the devices 182-1, 182-2 . . . 182-n, prior to or concurrently with the playing of the media content.

Accordingly, the systems and methods of the present disclosure enable subscribers to media programs to easily and efficiently provide media content, e.g., voice samples, utterances or other sounds generated by the subscribers, to creators or hosts of the media programs, and enable creators or hosts to readily incorporate such media content into their media programs. For example, a listener (or a subscriber) to a media program may record a voice sample, a snippet of audio, or other media content using any type or form of computer system or device, and provide the recorded voice sample, audio snippet or media content to a creator or a host of the media program over one or more networks. In some implementations, information regarding media content received from listeners may include, but need not be limited to, a request to participate in the media program, a request to have a selection of media (e.g., a song, a podcast, or a playlist) incorporated into the media program, a request to have the media content played during the media program (e.g., as a message or "shout out" to another listener, such as a loved one), a request to have media content generated or produced by the listener (e.g., a song or podcast) incorporated into the media program, or a request to have an opinion or a position of the listener included in an ongoing discussion of a topic of interest.

Media content received from listeners may be processed according to any algorithms, systems or techniques, including but not limited to one or more machine learning algorithms, systems or techniques, to transcribe or otherwise identify words uttered by a listener within such media content, to determine a sentiment associated with the media content, or to determine whether the sentiment or the words of a voice sample or an utterance are objectionable (e.g., obscene, indecent, profane or divisive).

In some implementations, audio data including or representing media content may be processed by one or more natural language understanding (or "NLU") processing module, a speech recognition engine or module, or another processing module, to identify words represented in the audio data. For example, one or more computer devices or systems may transform audio data captured by a device of a listener into data for processing by a speech recognition engine or module, which may compare the data to one or more acoustic models, language models or other data models to recognize any words incorporated in the audio data. In some implementations, data captured by a device of the listener may be processed, e.g., by an acoustic front end, to reduce noise or divided into frames representing one or more intervals of time for which values or features representing qualities of the data, along with a vector of such values or features, may be determined, e.g., by one or more mel-frequency cepstral coefficients (or "MFCCs"), perceptual linear predictive (or "PLP") techniques, neural network feature vector techniques, linear discriminant analysis, semi-tied covariance matrices, or any other approaches known to those of skill in the art.

In some implementations, a speech recognition engine or module may further process outputs of an acoustic front end by reference to information or data stored in a speech model storage. In some other implementations, a speech recognition engine may attempt to match features, or feature vectors, to phonemes or words identified by or stored in association with one or more acoustic models, language models, or other models. In some implementations, a speech recognition engine may also compute one or more values or scores for such feature vectors based on any information, data or metadata regarding the audio data, such an acoustic score representing a likelihood that a sound represented by a group of feature vectors matches a language phoneme. An acoustic score may be further adjusted based on an extent to which sounds and/or words are heard or used in context with each other, thereby enhancing a likelihood that an output of a speech recognition module or engine will have results that make sense grammatically. Such models may be general, e.g., with respect to a language, or specific with respect to a particular domain. Additionally, a speech recognition engine or module may use any number of techniques to match feature vectors to phonemes, e.g., Hidden Markov Models (or "HMM") to determine probabilities of matches between feature vectors and one or more phonemes. Speech recognition modules or engines may operate on any number of devices, including but not limited to a device that captured the audio data of a voice sample, one or more computer devices associated with a broadcast system, or a device associated with a creator. Results identified by a speech recognition module or engine may be provided to one or more other components, in the form of a single textual representation of speech included in a voice sample, a list of any number of hypotheses and respective scores, or any other representation.

Moreover, whether one or more words of a voice sample is objectionable may be determined in any manner, such as by comparison with a table or set of words previously designated as objectionable, or in any other manner.

In some implementations, media content, or a transcript or other written account of the media content, may be processed to determine a sentiment of the listener that provided the media content, or one or more evaluations, attitudes, appraisals, emotions, moods or judgments represented within the media content. For example, a sentiment or opinion may be identified or classified with respect to a transcript of media content as a whole, or with respect to one or more individual portions (e.g., passages, paragraphs or sentences) of the media content. When analyzing media content received from a listener, or a portion thereof, in order to identify a sentiment or opinion expressed therein, the media content may be bifurcated or otherwise divided into sections containing objective, fact-based statements or components, and sections containing subjective, opinion-based statements or components, the latter of which is considered or emphasized in a sentiment analysis context. Subjective, opinion-based statements or components may further be subdivided into groups of express opinions (e.g., "I like Siberian Huskies") or opinions of a comparative nature (e.g., "I prefer the colors blue and white over the colors burgundy and gold").

Additionally, a sentiment or opinion of media content may be identified broadly in terms of polarity, i.e., whether the media content is generally positive, negative or neutral, or in terms of grades or degrees. For example, media content may be classified as "happy" or "sad," "inspirational" or "depressing," "peaceful" or "disturbed," "angry" or "content," or with any other identifier or pair of identifiers, and to any extent or degree thereof, which may be expressed in one or more qualitative or quantitative terms. Moreover, sentiment analyses may be trained or restricted to a specific topic or category, or otherwise directed to obtaining a sentiment of a focused nature, such as a sentiment regarding the economy, sports or politics.

In order to identify and obtain a sentiment from media content, a transcript or other set of text or any data or information included in the media content may be analyzed in any manner. For example, one or more machine learning algorithms or techniques may be provided to determine a sentiment from a transcript of the media content, or the media content itself, e.g., by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses, which may be used to review and assess the media content, and to identify any pertinent keywords maintained therein, which may be analyzed and associated with one or more sentiments thereof.

After media content including a voice sample has been processed, transcribed and confirmed to contain unobjectionable content, or to contain substantially unobjectionable content, information regarding the media content may be provided to a computer device or system of a creator or host of a media program, and the creator may select media content to be included in a media program. The media content that may be included in a media program includes, but need not be limited to, a voice sample received from a listener, as well as one or more songs or other music files identified in the voice sample, which may be obtained from a music repository or streaming service, or any other media content. A broadcast system may establish or terminate connections with a creator, with any sources of media content, or with any number of listeners, to compile and seamlessly transmit the media program over digital channels (e.g., web-based or application-based), to any number of systems or devices of any form.

Creators of media programs may designate one or more types or files of media content to be broadcast to listeners via a user interface rendered on a display or by any type or form of computer device, in accordance with a broadcast plan or other schedule. For example, the media content may be identified in one or more notifications or other elements presented in a user interface, which may include one or more selectable or interactive features for searching for or browsing through the information regarding the media content (e.g., the voice samples). A broadcast system, or a mixing system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system and one or more other computer devices or systems. For example, conference channels may be established between a broadcast system and a source of media or other content, or between a broadcast system and devices of any number of listeners, for providing media content. Two-way communication channels, or bidirectional channels, may also be established between a broadcast system and one or more other computer devices or systems. For example, a broadcast channel may be established between a computer device or system of a creator or another source of media or other content and a broadcast system.

The communication channels of the present disclosure may be established, e.g., by a broadcast system, or a mixing system, in any manner. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called Web Socket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language (or "HTML"). This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established between a broadcast system (or a mixing system), and any type of entity, in accordance with a broadcast plan or sequence of media content. One or more user interfaces rendered by or on a computer system or device may permit a creator to control the synchronization or mixing of media content by the broadcast system. Gestures or other interactions with the user interfaces may be translated into commands to be processed by the broadcast system, e.g., to play a specific song, to insert a specific advertisement, or to take any other relevant actions, such as to adjust a volume or another attribute or parameter of media content. Moreover, a broadcast system may provide any relevant information to a creator via such user interfaces, including information regarding attributes or parameters of media content that was previously played, that is being played, or that is scheduled to be played in accordance with a broadcast plan or during a media program. The broadcast system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system may be overridden by a creator, e.g., by one or more gestures or other interactions with a user interface of an application in communication with the broadcast system that may be associated with the playing of the media content or the media program.

Figure 2:
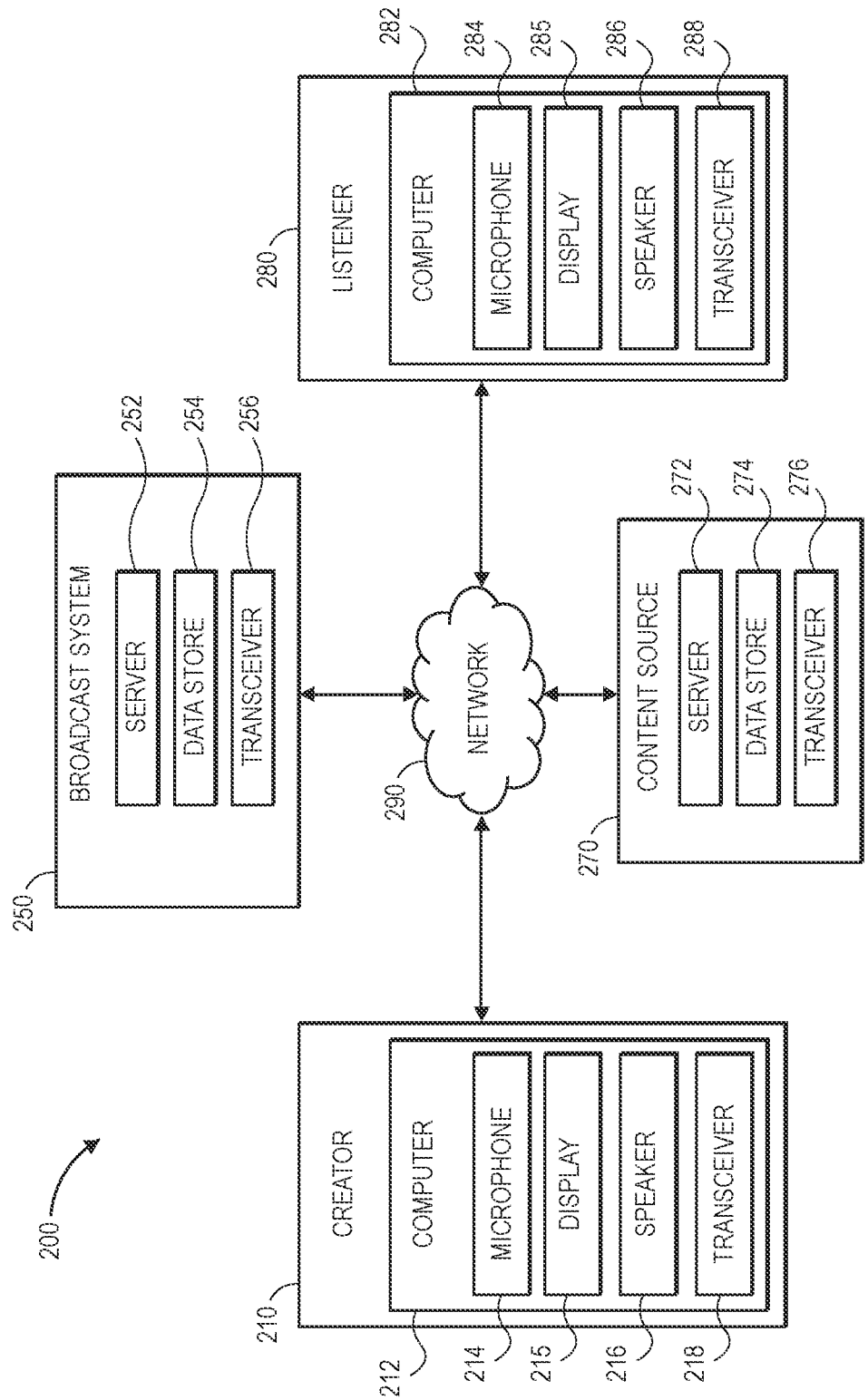
FIG. 2 is a block diagram of components of one system for receiving voice samples in accordance with embodiments of the present disclosure.

Referring to FIG. 2, a block diagram of components of one system 200 for receiving voice samples in accordance with embodiments of the present disclosure is shown. Except where otherwise noted, reference numerals preceded by the number "2" shown in FIG. 2 indicate components or features that are similar to components or features having reference numerals preceded by the number "1" shown in FIGS. 1A through 1E.

As is shown in FIG. 2, the system 200 shown in FIG. 2 includes a creator 210, a broadcast system 250 (e.g., a broadcast control system, or a mixing system), a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the broadcast system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the USB standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by receiving code (e.g., in HTML) for displaying the one or more user interfaces from one or more other computer systems, and interpreting the code to render the one or more user interfaces on the display 215, such as by a browser or another application. The computer system 212 may receive one or more gestures or other interactions with such user interfaces, and such gestures or other interactions may be interpreted to generate one or more instructions or commands that may be provided to one or more of the broadcast system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The broadcast system 250 may be any system that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The broadcast system 250 may operate or include a networked computer infrastructure, including one or more physical computer servers 252 and data stores 254 (e.g., databases) and one or more transceivers 256, that may be associated with the receipt or transmission of media or other information or data over the network 290. The broadcast system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the broadcast system 250 may be independently provided for the exclusive purpose of managing the monitoring and distribution of media content. Alternatively, the broadcast system 250 may be operated in connection with one or more physical or virtual services configured to manage the monitoring or distribution of media files, as well as one or more other functions. Additionally, the broadcast system 250 may include any type or form of systems or components for receiving media files and associated information, data or metadata, e.g., over the networks 290. For example, the broadcast system 250 may receive one or more media files via any wired or wireless means and store such media files in the one or more data stores 254 for subsequent processing, analysis and distribution. In some embodiments, the broadcast system 250 may process and/or analyze media files, such as to add or assign metadata, e.g., one or more tags, to media files.

The broadcast system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the broadcast system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the broadcast system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. In some embodiments, the content source 270 may also stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, for receiving media content associated with one or more media programs over the network 290 (e.g., a subscriber to one or more of the media programs). For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features.

Those of ordinary skill in the pertinent arts will recognize that the computer devices 212, 282 may include any number of hardware components or operate any number of software applications for playing media content received from the broadcast system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

Although the system 200 shown in FIG. 2 shows boxes for one creator 210, one broadcast system 250, one media source 270 and one listener 280, those of ordinary skill in the pertinent arts will recognize that any number of creators 210, broadcast systems 250, media sources 270 or listeners 280 may access, hear, or view media content provided in accordance with implementations of the present disclosure. Moreover, the computer devices 212, 282 may include all or fewer of the components shown in FIG. 2 or perform all or fewer of the functions described herein.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the broadcast system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the broadcast system 250, the media source 270 or the listener 280 may operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the broadcast system 250, the media source 270 or the listener 280, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
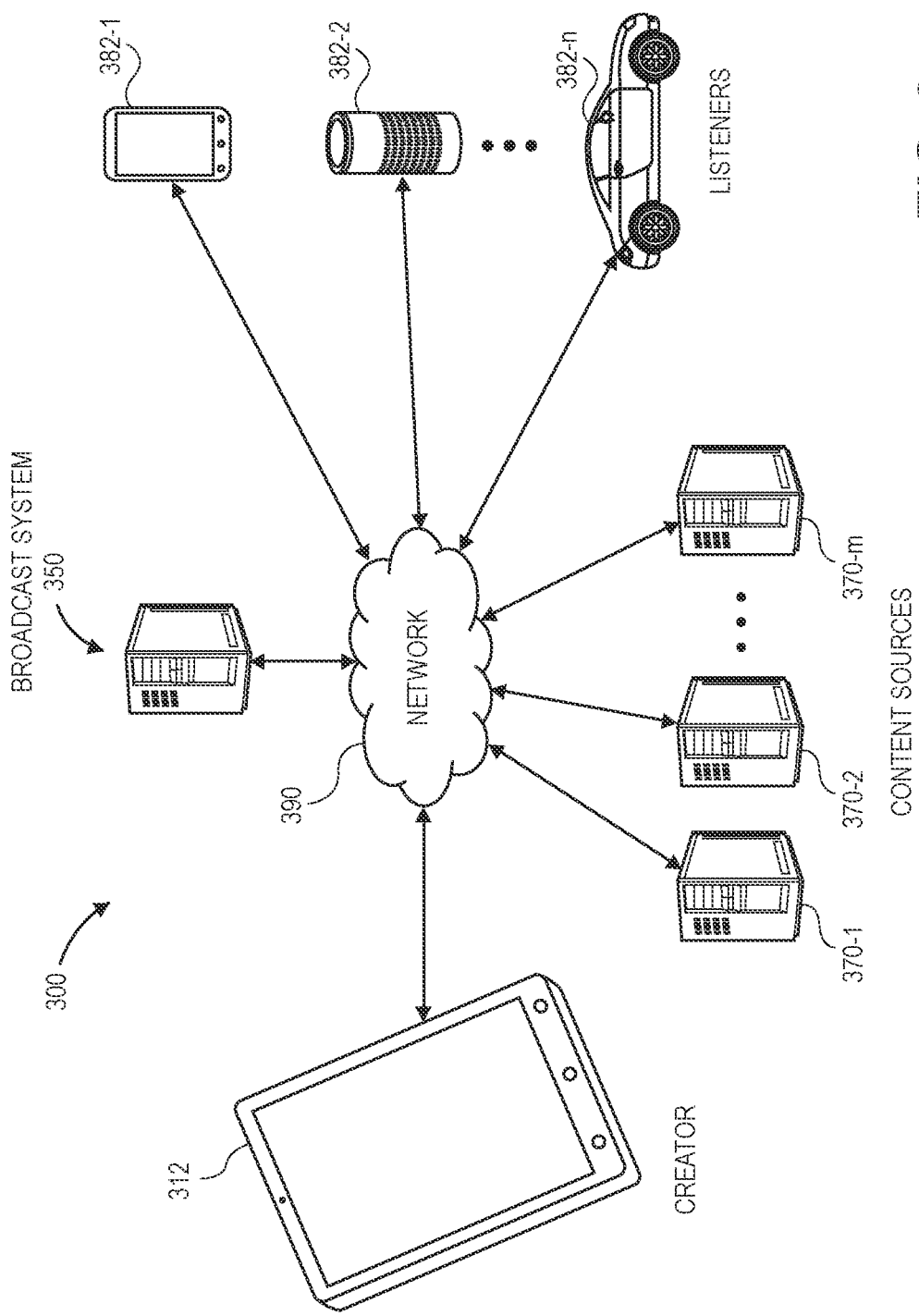
FIG. 3 is a view of aspects of one system for receiving voice samples in accordance with embodiments of the present disclosure.

Referring to FIG. 3, a view of aspects of one system for receiving voice samples in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2 or by the number "1" shown in FIGS. 1A through 1E. As is shown in FIG. 3, the system 300 includes a device 312 of a creator of a media program, a broadcast system 350, a plurality of content sources 370-1, 370-2 . . . 370-m and devices 382-1, 382-2 . . . 382-n of a plurality of listeners (or subscribers) that are connected to one another over a network 390, which may include the Internet in whole or in part.

The device 312 of the creator may include one or more microphones, an interactive display, one or more speakers, one or more processors and one or more transceivers configured to enable communication with one or more other computer systems or devices. In some implementations, the device 312 may be a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the broadcast system 350. Alternatively, the device 312 may be any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the broadcast system 350 may be any server or other computer system or device configured to receive information or data from the device 312, the media sources 370-1, 370-2 . . . 370-m, or any of the devices 382-1, 382-2 . . . 382-n, or transmit any information or data to the creator 310, the media sources 370-1, 370-2 . . . 370-m, or any of the devices 382-1, 382-2 . . . 382-n over the network 390. In some implementations, the broadcast system 350 may establish one-way or two-way communications channels between the creator 310, the media sources 370-1, 370-2 . . . 370-m, or any of the devices 382-1, 382-2 . . . 382-n in accordance with a broadcast plan (or a sequence of media content, or another schedule), or at the direction of the creator by way of the device 312. The broadcast system 350 may also transmit or receive information or data along such communication channels, or in any other manner.

Likewise, the content sources 370-1, 370-2 . . . 370-m may be servers or other computer systems having media content stored thereon, or access to media content, that are configured to transmit media content to the device 312 or any of the devices 382-1, 382-2 . . . 382-n in response to one or more instructions or commands from the creator 310 or the broadcast system 350. The media content stored on or accessible to the content sources 370-1, 370-2 . . . 370-m may include one or more advertisements, songs or media files, news programs, sports programs, weather reports or any other media files, which may be live or previously recorded. The number of content sources 370-1, 370-2 . . . 370-m that may be accessed by the broadcast system 350, or the types of media content stored thereon or accessible thereto, is not limited.

The devices 382-1, 382-2 . . . 382-n may also be any type or form of computer system or device configured to receive and present media content, e.g., at least a portion of an automobile, a desktop computer, a laptop computer, a media player, a smartphone, a smart speaker, a tablet computer, a television, or a wristwatch, or others.

The broadcast system 350 may establish or terminate connections with the device 312, with any of the content sources 370-1, 370-2 . . . 370-m, or with any of the devices 382-1, 382-2 . . . 382-n, as necessary, to compile and seamlessly transmit media programs over digital channels (e.g., web-based or application-based), to the devices 382-1, 382-2 . . . 382-n in accordance with a broadcast plan or subject to the control of the creator 310. Furthermore, in some implementations, one or more of the listeners operating the devices 382-1, 382-2 . . . 382-n may be content sources, e.g., musicians, celebrities, personalities, athletes, politicians, or artists. For example, where the broadcast system 350 has established one-directional channels, e.g., conference channels, with any of the devices 382-1, 382-2 . . . 382-n, the broadcast system 350 may terminate one of the one-directional channels with one of the devices 382-1, 382-2 . . . 382-n, and establish a two-directional channel with that one of the devices 382-1, 382-2 . . . 382-n, thereby enabling that listener to not only receive but also transmit media content to the device 312 or any of the other listeners.

Figure 4:
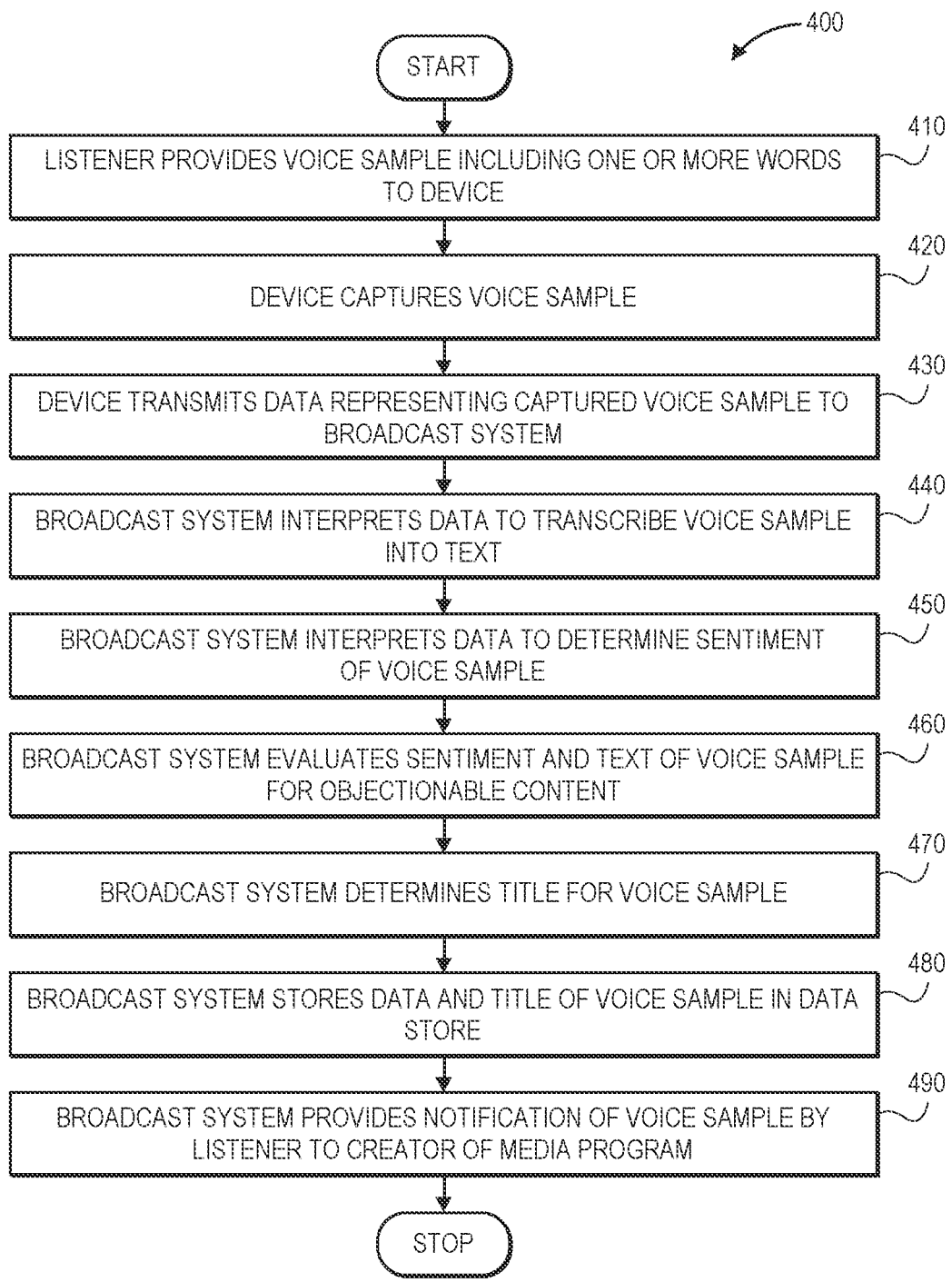
FIG. 4 is a flow chart of one process for receiving voice samples in accordance with embodiments of the present disclosure.

Referring to FIG. 4, a flow chart of one process for receiving voice samples in accordance with embodiments of the present disclosure is shown. At box 410, a listener provides a voice sample including one or more words to a device. For example, the device may be at least a portion of an automobile, a desktop computer, a laptop computer, a media player, a smartphone, a smart speaker, a tablet computer, a television, or a wristwatch, or other device or system having one or more microphones or other acoustic sensors.

At box 420, the device captures the voice sample. For example, acoustic sensors of the device, or an auxiliary system associated with the device, such as the ear buds 113 of FIG. 1A, may capture audio data (e.g., spoken words) and store the audio data in one or more memory components or data stores. At box 430, the device transmits data representing the captured voice sample to a broadcast system, e.g., over one or more networks.

In some implementations, the data includes information, data or metadata regarding the voice sample. In some other implementations, the data may include audio files (e.g., music, podcasts, news, or others) of any form or format, such as one or more Advanced Audio Coding ("AAC"), Audio Interchange File Format ("AIFF"), lossless audio codec, lossless encoder, Moving Picture Experts Group (or "MPEG") Audio Layer III (e.g., "MP3"), Vorbis (e.g., Ogg Vorbis), Waveform Audio File ("WAV"), Windows Media Audio ("WMA"), or other forms or formats, and at any bit rate or level of compression (e.g., 128, 192, 256 or 320 kilobits per second).

At box 440, the broadcast system interprets the data to transcribe the voice sample into text. For example, the broadcast system may operate one or more machine learning algorithms, systems or techniques that are trained to recognize speech, or other algorithms, systems or techniques that are so configured, in order to recognize and interpret any spoken words represented within the data. In some implementations, the data may be compared with portions of sounds (e.g., sub-word units or phonemes) or sequences of such sounds to identify any words represented in the data, including but not limited to a wake word, as well as any context features represented within the data.

At box 450, the broadcast system interprets the data to determine a sentiment of the voice sample. For example, the data may be provided to one or more sentiment analysis algorithms, systems or techniques, such as log likelihood similarities, latent Dirichlet allocations or other topic models, or latent semantic analyses, in order to determine whether the data represents any words relating to one or more sentiments of a listener. In some implementations, the sentiment analyses may identify any sentiments, opinions, evaluations, attitudes, appraisals, emotions, moods or judgments of the listener at the given time. The sentiment of the listener may be defined with respect to a polarization of the sentiment (e.g., "positive," "negative" or "neutral"), or in any qualitative or quantitative manner, including existing or recognized terms or variables for defining a sentiment (e.g., keywords such as "happy" or "sad"), as well as any custom-defined terms or variables.

At box 460, the broadcast system evaluates a sentiment and the text of the voice sample to determine whether the voice sample includes objectionable (e.g., obscene, indecent, profane or divisive) content. In some implementations, whether the voice sample includes any objectionable content may be determined along with the transcription of the voice sample at box 440, or the sentiment of the voice sample at box 450, e.g., by a common algorithm, system or technique. In some other implementations, however, whether the voice sample includes any objectionable content may be determined after transcribing the voice sample into text, and after determining the sentiment of the voice sample.

At box 470, the broadcast system determines a title of the voice sample. For example, the title of the sample may be selected based on a portion of the words represented in the voice sample, e.g., a set of one or more words initially uttered at an outset of the voice sample, or from a characterization or a summary of the voice sample determined from the text of the voice sample or the sentiment of the voice sample, or on any other basis.

At box 480, the broadcast system stores the data and the title of the voice sample in one or more data stores, e.g., in one or more physical or virtual locations, such as a "cloud"-based environment. At box 490, the broadcast system provides a notification of the voice sample received from the listener to a creator of a media program, and the process ends. For example, the creator may have expressly requested that one or more listeners provide voice samples in association with a media program, e.g., by inviting the listeners to participate in the radio program, to provide one or more media selections (such as specific titles of media content such as songs or videos, as well as media content associated with one or more artists, genres, moods, playlists, podcasts, songs, videos or others), to provide their own words or other media content to be included in the media program, or to provide their personal opinions on topics of interest, or to provide feedback of any other type or form. Information regarding the voice sample may be provided to a computer device or system of the creator and displayed in one or more user interfaces, which may be associated with a network page (e.g., a web page) rendered by a browser, or a dedicated application for constructing media programs operating on the computer device or system.

Notifications of the voice sample, or any number of voice samples, may be provided to the creator in any manner, such as by one or more messaging techniques, or by presenting information regarding the voice sample, or any other voice samples, in a user interface displayed on a computer device or system of the creator. Additionally, one or more steps of the process represented in the flow chart 400 of FIG. 4 may be repeated for any number of voice samples or utterances received from devices associated with any number of listeners.

In some implementations, the systems and methods of the present disclosure enable listeners of media programs to provide audible feedback in the form of voice samples to creators of the media programs, and enable the creators to modify the media programs based on the audible feedback, such as to include one or more of the voice samples in the media programs, or to identify other media content based on the voice samples and incorporate that media content into the media programs. Referring to FIGS. 5A through 5E, views of aspects of one system for receiving voice samples in accordance with embodiments of the present disclosure are shown. Except where otherwise noted, reference numerals preceded by the number "5" shown in FIGS. 5A through 5E indicate components or features that are similar to components or features having reference numerals preceded by the number "3" shown in FIG. 3, by the number "2" shown in FIG. 2 or by the number "1" shown in FIGS. 1A through 1E.

Figure 5A:
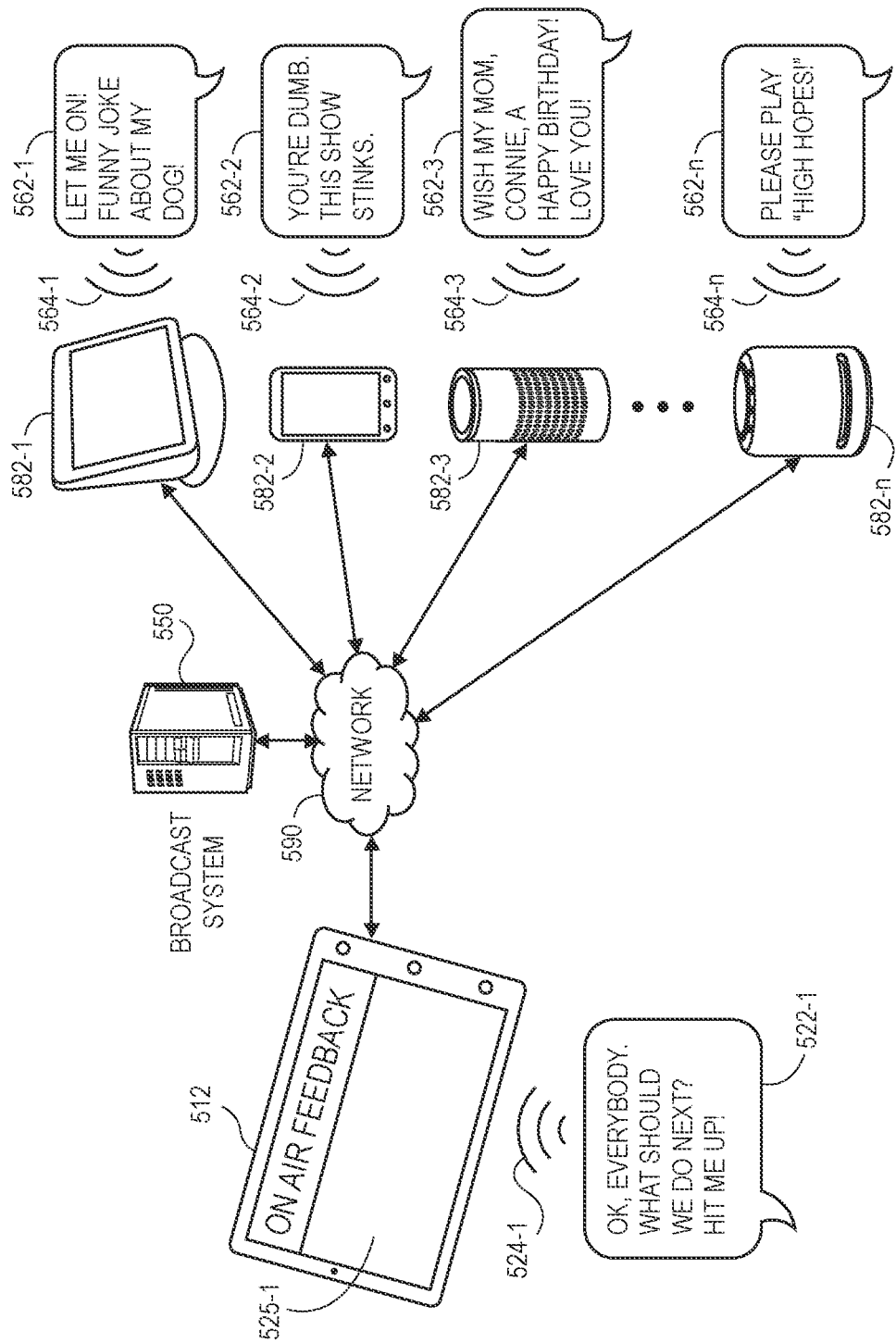

As is shown in FIG. 5A, a creator (not shown) of a media program provides an utterance 522-1 to a mobile device 512 (e.g., a tablet computer, a smartphone, or any other computer device or system) having one or more user interfaces 525-1 rendered on a display 515, e.g., by interpreting code received from a broadcast system 550 or from any other source. Data 524-1 captured by the mobile device 512 may be transmitted to the broadcast system 550 or to one or more devices 582-1, 582-2, 582-3 . . . 582-n of any number n of listeners over one or more networks 590. For example, the utterance 522-1 includes an invitation for listeners to provide recommendations of media content or other material to be incorporated into a media program, viz., "OK, everybody. What should we do next? Hit me up!" Upon receiving the data 524-1, the devices 582-1, 582-2, 582-3 . . . 582-n may present one or more words of the utterance 522-1, e.g., the invitation for the listeners to provide recommendations of media content or other material. In response to the utterance 522-1, the listeners may provide one or more voice samples 562-1, 562-2, 562-3 . . . 562-n to the respective devices 582-1, 582-2, 582-3 . . . 582-n.

For example, as is shown in FIG. 5A, a listener may provide a voice sample 562-1 to the device 582-1 indicating a request to tell a joke during the media program, viz., "Let me on! Funny joke about my dog!" Data 564-1 representing the voice sample 562-1 may be transmitted to the broadcast system 550 or the mobile device 512 over the one or more networks 590. Similarly, a listener may provide a voice sample 562-2 to the device 582-2 that crudely expresses dissatisfaction with the media program, viz., "You're dumb. This show stinks," while another listener may provide a voice sample 562-3 to the device 582-3 requesting to send a message to her mother, viz., "Wish my Mom, Connie, a happy birthday! Love you!" and yet another listener may provide a voice sample 562-n to the device 582-n requesting that specific media content identified by a title be incorporated into the media program, viz., "please play 'High Hopes'!" Data 564-2, 564-3 . . . 564-n representing the voice samples 562-2, 562-3 . . . 562-n may also be transmitted to the broadcast system 550 or the mobile device 512 over the one or more networks 590 in a similar manner.

As is shown in FIG. 5B, the data 564-1, 564-2, 564-3 . . . 564-n may be processed by the broadcast system 550 (or another computer device or system) to identify one or more words expressed within the respective voice samples 562-1, 562-2, 562-3 . . . 562-n, and also to identify sentiments of the respective voice samples 562-1, 562-2, 562-3 . . . 562-n, to classify the respective voice samples 562-1, 562-2, 562-3 . . . 562-n, to determine a duration of each of the respective voice samples 562-1, 562-2, 562-3 . . . 562-n, or to take any other action regarding one or more of the respective voice samples 562-1, 562-2, 562-3 . . . 562-n. For example, in some implementations, based upon the sentiments of or the words expressed in the respective voice samples 562-1, 562-2, 562-3 . . . 562-n, whether any of the voice samples 562-1, 562-2, 562-3 . . . 562-n includes objectionable content may be determined.

As is further shown in FIG. 5B, information (or data) 568-1, 568-2, 568-3, 568-n regarding the voice samples 562-1, 562-2, 562-3 . . . 562-n is determined by the broadcast system 550 based on the data 564-1, 564-2, 564-3, 564-n. The information 568-1, 568-2, 568-3 . . . 568-n may be determined in any manner, such as by providing at least some of the data 564-1, 564-2, 564-3 . . . 564-n to one or more algorithms, systems or techniques (e.g., machine learning algorithms, systems or techniques) that are trained to recognize speech, to determine sentiments, to detect objectionable words, or to perform any other applications or functions on the data 564-1, 564-2, 564-3 . . . 564-n.

For example, as is shown in FIG. 5B, the information 568-1 includes at least a portion of the voice sample 562-1, as well as a classification of the voice sample 562-1 (viz., as a request to participate in the media program), an indicator of a sentiment of the voice sample 562-1 (viz., comedy), and a duration of the voice sample 562-1 (viz., eight seconds). Similarly, the information 568-2 includes at least a portion of the voice sample 562-2, as well as an indication that the voice sample 562-2 includes objectionable content, and a duration of the voice sample 562-2 (viz., eleven seconds). The information 568-3 includes at least a portion of the voice sample 562-3, as well as a classification of the voice sample 562-3 (viz., as a "shout-out," or a short acknowledgment of another person, typically intended to be presented to the public), an indicator of a sentiment of the voice sample 562-3 (viz., kind), and a duration of the voice sample 562-3 (viz., thirteen seconds), while the information 568-n includes at least a portion of the voice sample 562-n, as well as a classification of the voice sample 562-n (viz., as a request for media content), an indicator of a sentiment of the voice sample 562-n (viz., energetic), and a duration of the voice sample 562-n (viz., eight seconds).

As is further shown in FIG. 5B, because the voice samples 562-1, 562-3, 562-n have been determined to not include objectionable content, the information 568-1, 568-3, 568-n is provided to the creator, e.g., over the one or more networks 590, or stored in one or more memory components or data stores that are accessible to the creator. Conversely, because the voice sample 562-2 has been determined to include objectionable content, the information 568-2 is discarded, or otherwise not provided to the creator 510. Alternatively, the information 568-2 may be provided to the creator along with the information 568-1, 568-3, 568-n, stored in one or more data stores or memory components or, in some embodiments, transmitted or otherwise provided to one or more authorities for analysis.

Figure 5C:
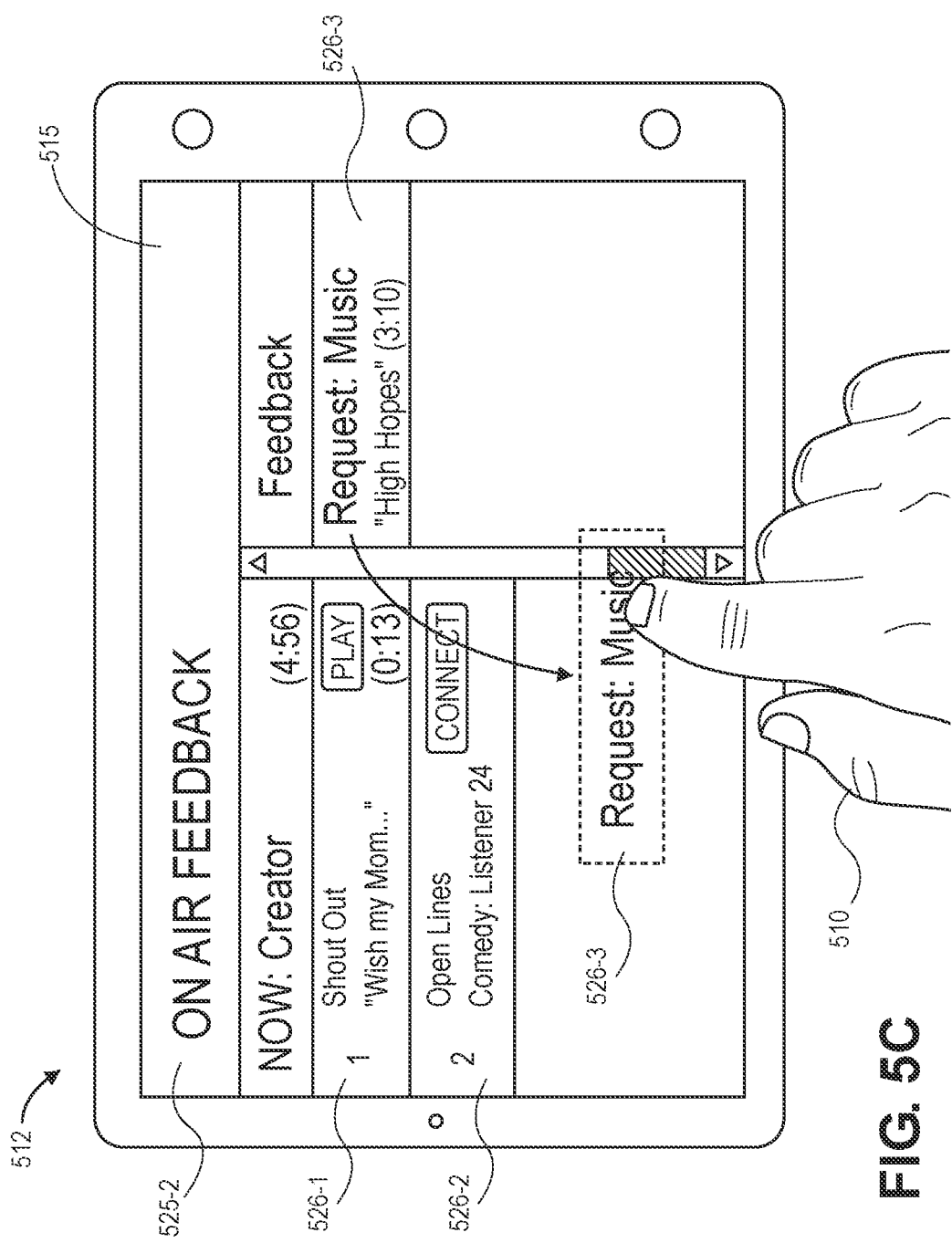

As is shown in FIG. 5C, upon receiving the information 568-1, 568-3, 568-n, the creator 510 is able to incorporate media content including or relating to the voice samples 562-1, 562-3, 562-n in the media program by one or more gestures or other interactions with a user interface 525-2 rendered on the display 515 of the mobile device 512. For example, as is shown in FIG. 5C, the user interface 525-2 includes a plurality of elements 526-1, 526-2, 526-3, with each of the plurality of elements 526-1, 526-2, 526-3 corresponding to one of the voice samples 562-1, 562-3, 562-n (viz., "Feedback"). As is further shown in FIG. 5C, the creator 510 may interact with any of the elements 526-1, 526-2, 526-3 to place one or more of such elements on or within another portion of the user interface 525-2 corresponding to a broadcast plan for the media program, e.g., by a drag-and-drop gesture or any other interaction.

The elements 526-1, 526-2, 526-3 may further include one or more interactive or selectable elements or features that, when activated by the creator 510, enable the creator 510 to define, modify or establish a broadcast plan (or sequence of media content) for the media program, such as to play one of the voice samples 562-1, 562-3, 562-n during the media program, to connect with a listener that provided one of the voice samples 562-1, 562-3, 562-n, or to take any other action associated with the voice samples 562-1, 562-3, 562-n. In some implementations, the elements 526-1, 526-2, 526-3 may further include titles or other descriptors of each of the voice samples 562-1, 562-3, 562-n, identifiers of listeners that provided each of the voice samples 562-1, 562-3, 562-n, as well as representative text or words of each of the voice samples 562-1, 562-3, 562-n, or identifiers of any media content (e.g., artists, genres, moods, playlists, podcasts, songs, videos or others) described in each of the voice samples 562-1, 562-3, 562-n.

Figure 5D:
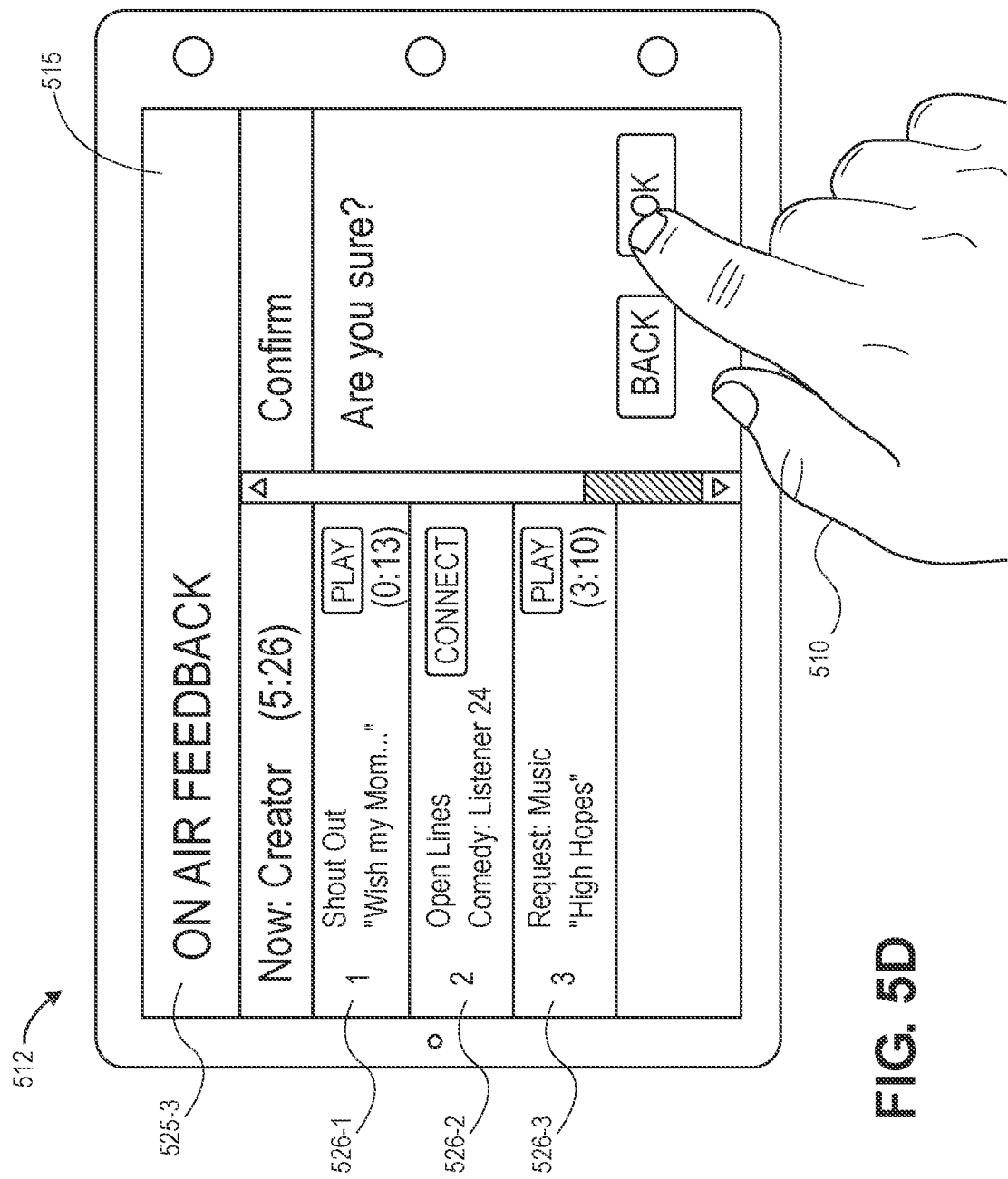

As is shown in FIG. 5D, a user interface 525-3 is rendered on the display 515 of the mobile device 512. The user interface 525-3 includes the elements 526-1, 526-2, 526-3, each having one or more interactive or selectable elements or features that, when activated by the creator 510, enable the creator 510 to incorporate media content associated with one of the voice samples 562-1, 562-3, 562-n into the media program, e.g., by causing data for presenting the media content to listeners to be transmitted to each of the devices 582-1, 582-2, 582-3 . . . 582-n over the one or more networks 590. For example, as is shown in FIG. 5D, the element 526-1 enables the creator 510 to select a button or another element or feature, e.g., by one or more gestures or other interactions with the user interface 525-3, to cause the voice sample 562-3, viz., "Wish my Mom, Connie, a happy birthday! Love you!," to be played by the devices 582-1, 582-2, 582-3 ... 582-*n*. The element 526-2 enables the creator 510 to connect with the device 582-1 of the listener that provided the voice sample 562-1, and enable that listener to participate in the media program, e.g., by providing a joke or other content that is then transmitted to the devices 512, 582-2, 582-3, 582-*n* of the creator 510 or the other listeners. The element 526-3 further enables the creator 510 to select a button or another element or feature for causing a playing of a media selection described in the voice sample 562-*n*, viz., a song entitled "High Hopes," by the devices 582-1, 582-2, 582-3 ... 582-*n*. Alternatively, the elements 526-1, 526-2, 526-3 may include, or the creator 510 may select, any other buttons or other elements or other features associated with voice samples received from listeners, or to cause data for presenting any media content to listeners of the devices 582-1, 582-2, 582-3, 582-*n*. One or more connections may be established or terminated, as necessary, in order to present such media content to listeners of the devices 582-1, 582-2, 582-3, 582-*n*.

Figure 5E:
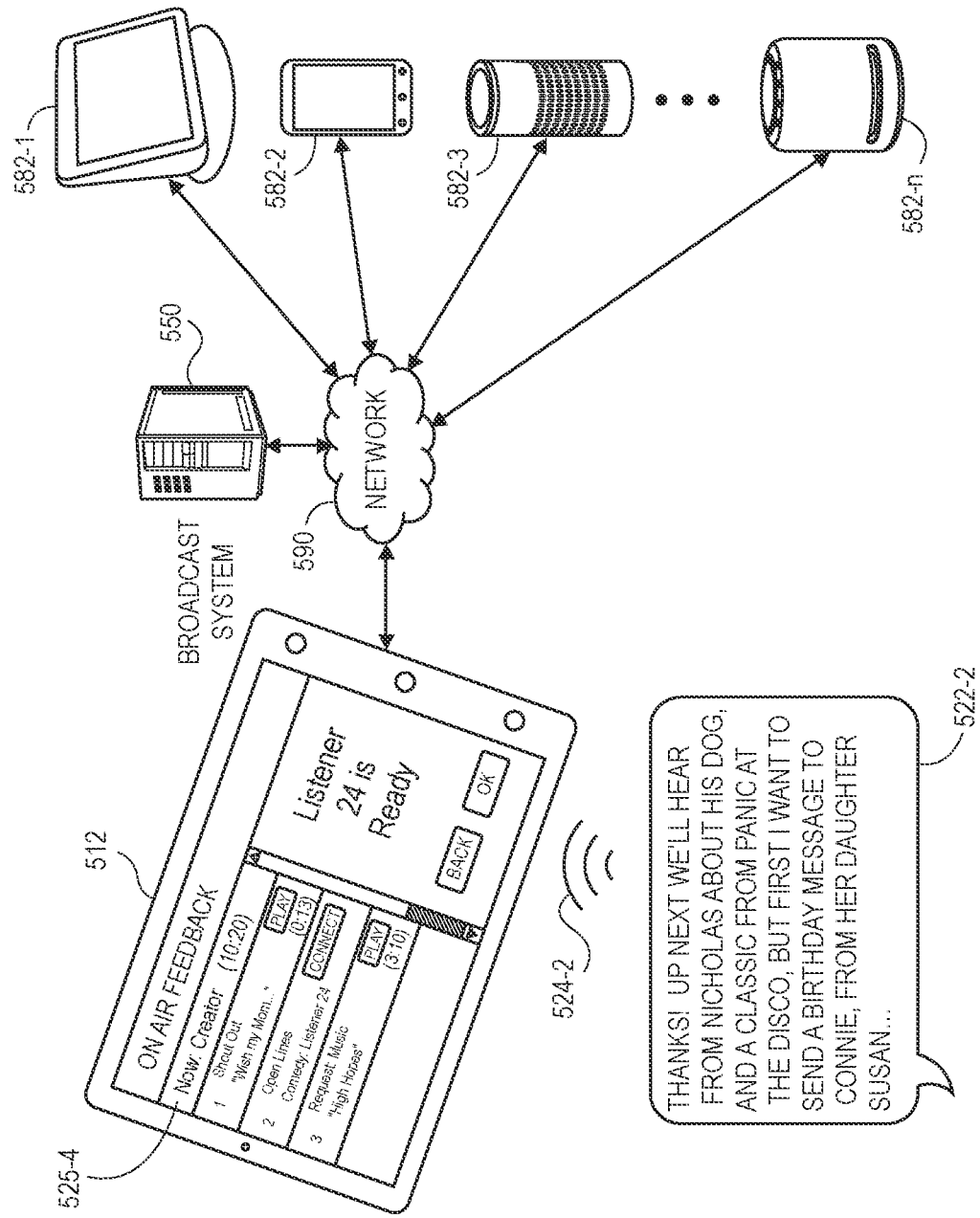

As is shown in FIG. 5E, after the creator 510 has defined, modified or established a broadcast plan including media content selected based on one or more of the voice samples 562-1, 562-3, 562-*n*, the creator 510 may cause the media content, or any other media content, to be played by the devices 582-1, 582-2, 582-3 ... 582-*n* in accordance with the broadcast plan. For example, the creator 510 may execute one or more gestures or other interactions with a user interface 525-4 to cause data for playing the media content to be transmitted to the devices 582-1, 582-2, 582-3 ... 582-*n*. Alternatively, the creator 510 may provide one or more utterances 522-2 to the mobile device 512 regarding the media content that was selected based on the voice samples 562-1, 562-3, 562-*n*, viz., "Thanks! Up next we'll hear from Nicholas about his dog, and a classic from Panic at the Disco, but first I want to send a birthday message to Connie, from her daughter Susan." The creator 510 may then cause at least a portion of the voice sample 562-3 to be played by the devices 582-1, 582-2, 582-3 ... 582-*n*, before establishing a connection with the device 582-1 to communicate with the listener that provided the voice sample 562-1, and causing the media selection identified in the voice sample 562-*n* to be played by the devices 582-1, 582-2, 582-3 ... 582-*n*, e.g., by one or more gestures or other interactions with the user interface 525-4, or in any other manner.

Figure 6:
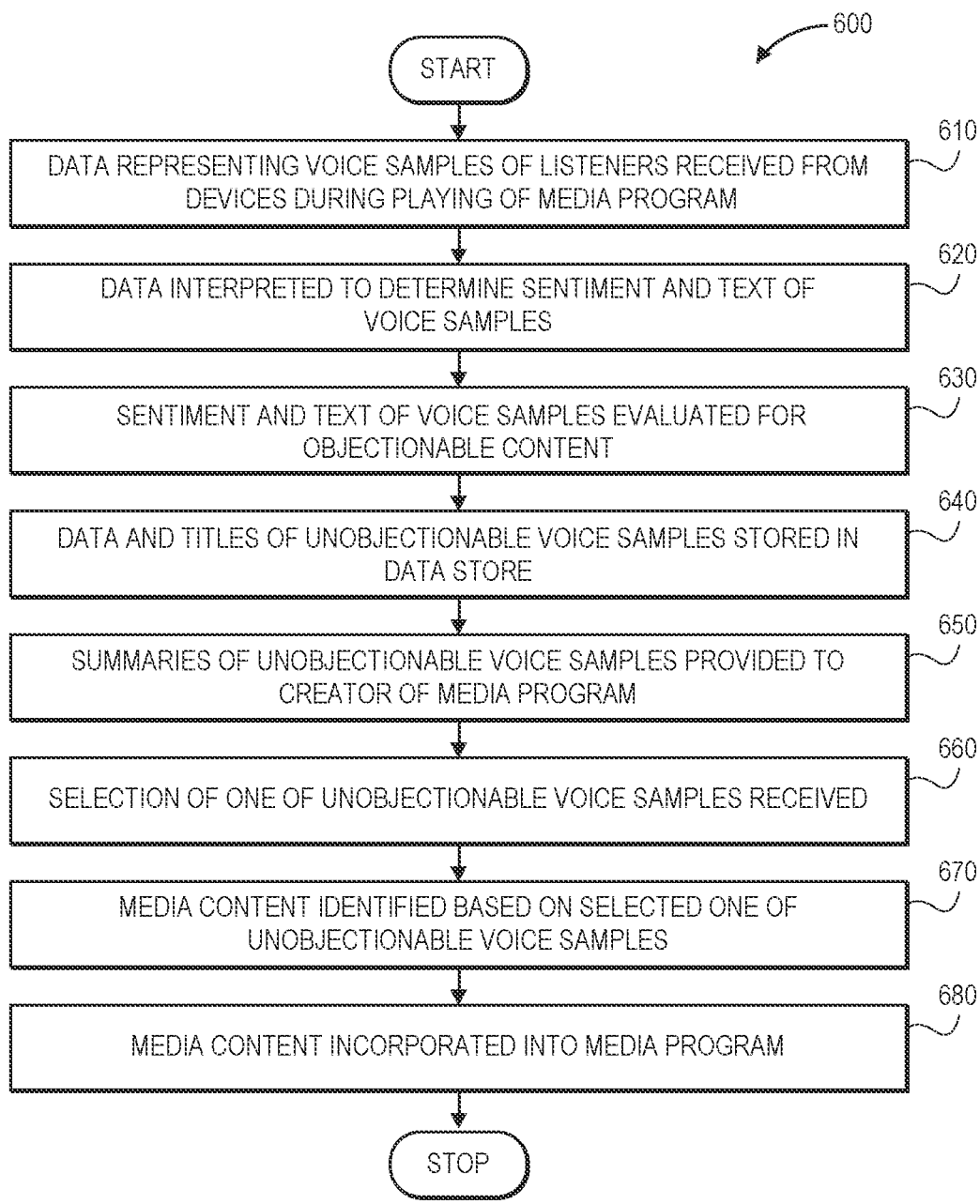
FIG. 6 is a flow chart of one process for receiving voice samples in accordance with embodiments of the present disclosure.

Referring to FIG. 6, a flow chart of one process for receiving voice samples in accordance with embodiments of the present disclosure is shown. At box 610, data representing one or more voice samples of listeners is received from devices during a playing of a media program, e.g., on the devices. For example, the data may include information, data or metadata regarding the voice samples, as well as media content representing the voice samples, in any form or format. In some implementations, two-way communications channels, e.g., a broadcast channel, may be established with devices of one or more of the listeners, such as by Web Socket or any other technique or protocol, and data may be transmitted to or received from the devices of the listeners via the respective channels.

At box 620, the data received from each of the devices of the listeners is interpreted to determine sentiments and text of the respective voice samples. For example, the data may be provided to one or more machine learning algorithms, systems or techniques that are trained to recognize speech, or other algorithms, systems or techniques that are so configured, in order to recognize and interpret any spoken words represented within the data, such as by comparing the data with portions of sounds (e.g., sub-word units or phonemes) or sequences of such sounds to identify any words represented in the data, e.g., wake words, as well as any context features represented within the data. The data may also be provided to one or more sentiment analysis algorithms, systems or techniques, such as log likelihood similarities, latent Dirichlet allocations or other topic models, or latent semantic analyses, in order to determine whether the data represents any words relating to one or more sentiments of a listener.

At box 630, the sentiments and the text of the voice samples are evaluated to determine whether any of the voice samples includes objectionable (e.g., obscene, indecent, profane or divisive) content. At box 640, the data and titles of the voice samples that are deemed to be unobjectionable are stored in one or more data stores. For example, titles (or summaries) of the voice samples, which may be determined from one or more words included in the voice samples, as well as transcripts of the respective voice samples, or any other information or data regarding the voice samples. Each of the sets of data may be indexed by or associated with their respective titles. Alternatively, in some implementations, data and titles of voice samples that are deemed to be objectionable may also be stored in the one or more data stores, together with or separate from the data and titles of the voice samples that are deemed to be unobjectionable.

At box 650, summaries of the unobjectionable voice samples are provided to a creator of the media program. The creator may be any individual or entity that has constructed the media program, e.g., from a computer device or system, and selected media content to be presented to the listeners in accordance with the media program. The summaries may be provided to a computer device or system associated with the creator, e.g., in the form of one or more electronic messages, or displayed in one or more user interfaces rendered on a display of the computer device or system.

At box 660, a selection of one of the unobjectionable voice samples is received from the creator. For example, where information or one or more selectable features regarding the respective voice samples that have been determined to be unobjectionable is displayed in one or more user interfaces rendered on a display, the creator may execute one or more gestures or interactions with the user interfaces to indicate a selection of, or preference for, one of the voice samples. Such user interfaces may include any number of buttons, text boxes, checkboxes, drop-down menus, list boxes, toggles, pickers, search fields, tags, sliders, icons, carousels, or any other interactive or selectable elements or features.

At box 670, media content is identified based on the one of the unobjectionable voice samples selected at box 660. For example, in some implementations, the media content may be or include the selected one of the unobjectionable voice samples, which may include words spoken by one or more of the listeners, music generated by one or more of the listeners, or any other sounds received from one or more of the listeners. In some other implementations, the media content may be identified within the selected one of the unobjectionable voice samples, e.g., a song, a podcast, a playlist, or other media content described in one or more words spoken by the listener as expressed within the selected one of the voice samples. Alternatively, the media content may have not yet been captured when the media content is identified. For example, where the selected one of the unobjectionable voice samples is a request to participate in the media program received from a listener, or where the creator elects to invite a listener that provided the selected one of the unobjectionable voice samples to participate in the media program, media content to be provided at least in part by the listener, e.g., an interview with the listener, or a media production of the listener to be performed at a later time, may be identified based on the one of the unobjectionable voice samples selected at box 660.

At box 680, the media content identified at box 670 is incorporated into the media program, and the process ends. Where a creator has identified media content based on a selected voice sample, data for presenting the media content to listeners may be transmitted to the respective devices of the listeners, subject to the ultimate control of the creator, who may extend, shorten or modify a media program by one or more gestures or other interactions with a computer system or device. In some implementations, such gestures or other interactions may result in the creation of a broadcast plan, or in the modification of a previously created broadcast plan. For example, the creator may designate periods during which the media content identified at box 670 is to be included in the media program, including but not limited to media content of any type or form, using any elements or features rendered on a user interface. In some implementations, the creator may also designate periods during which the creator may speak or generate one or more other sounds (e.g., music played by the creator, or words spoken or sung by the creator), as well as periods during which advertisements, music, news, sports, weather, or other programming, or interviews or other files or content generated by one or more other individuals are to be included in the media program.

Information regarding voice samples received from listeners may be provided to a creator in a searchable or indexed format that enables the creator to browse, search for, identify or select one or more of the voice samples, e.g., to include the voice sample in a media program, or to connect with a listener or a device that provided the voice sample. Referring to FIGS. 7A through 7E, views of aspects of one system for receiving voice samples in accordance with embodiments of the present disclosure are shown. Except where otherwise noted, reference numerals preceded by the number "7" shown in FIGS. 7A through 7E indicate components or features that are similar to components or features having reference numerals preceded by the number "5" shown in FIGS. 5A through 5E, by the number "3" shown in FIG. 3, by the number "2" shown in FIG. 2 or by the number "1" shown in FIGS. 1A through 1E.

Figure 7A:
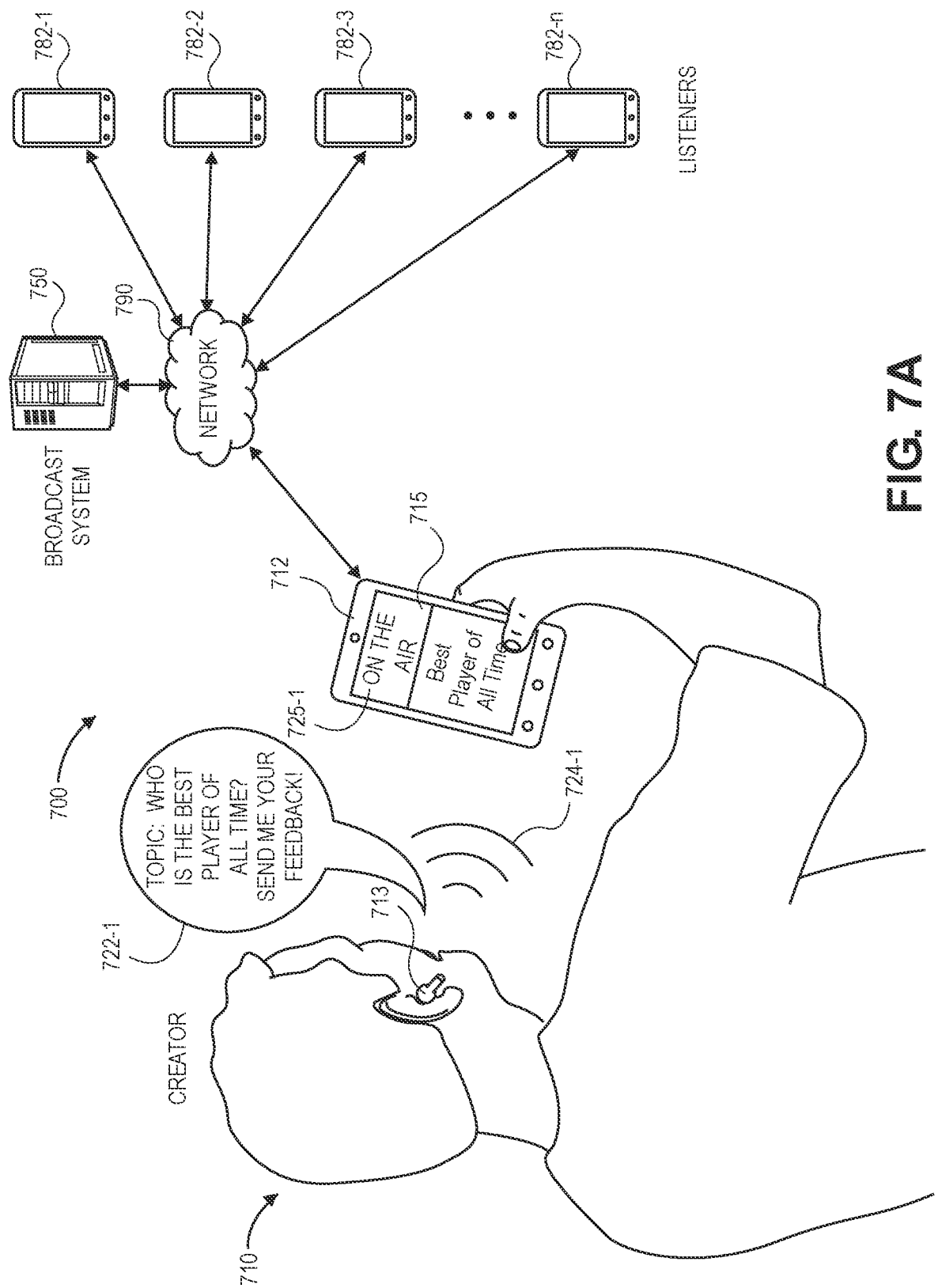
FIGS. 7A through 7E are views of aspects of one system for receiving voice samples in accordance with embodiments of the present disclosure.

As is shown in FIG. 7A, a system 700 includes a mobile device 712 of a creator 710, a broadcast system 750 (e.g., one or more servers or other computer systems) and a plurality of computer devices 782-1, 782-2, 782-3 . . . 782-n or other systems of any number n of listeners that are connected to one another over one or more networks 790, which may include the Internet in whole or in part. The creator 710 wears one or more ear buds 713 or other devices that may be in communication with the mobile device 712, and may exchange data relating to audio signals or any other data with the mobile device 712. Each of the computer devices 782-1, 782-2, 782-3 . . . 782-n shown in FIG. 7A is a mobile device (e.g., a tablet computer, a smartphone, or like system). Alternatively, in some implementations, the system 700 may include any number of computer devices or systems, and such devices or systems need not be limited to mobile devices.

As is shown in FIG. 7A, the mobile device 712 includes a display 715 (e.g., an interactive display or touchscreen) having a user interface 725-1 rendered thereon. As is further shown in FIG. 7A, the creator 710 provides an utterance 722-1 of one or more words that are intended to be heard by one or more listeners using the computer devices 782-1, 782-2, 782-3 . . . 782-n. In particular, the creator 710 invites such listeners to provide him with voice samples including commentary, viz., "Topic: who is the best player of all time? Send me your feedback!" The mobile device 712 and/or the ear buds 713 may capture acoustic data 724-1 representing the utterance 722-1 of the creator 710, and transmit the data 724-1 to the broadcast system 750 over the one or more networks 790. The broadcast system 750 may then cause data, e.g., some or all of the data 724-1 to be transmitted to one or more computer systems or devices of listeners over one or more networks 790, viz., the computer devices 782-1, 782-2, 782-3 . . . 782-n, in order to present the invitation of the creator 710 to such listeners.

Figure 7B:
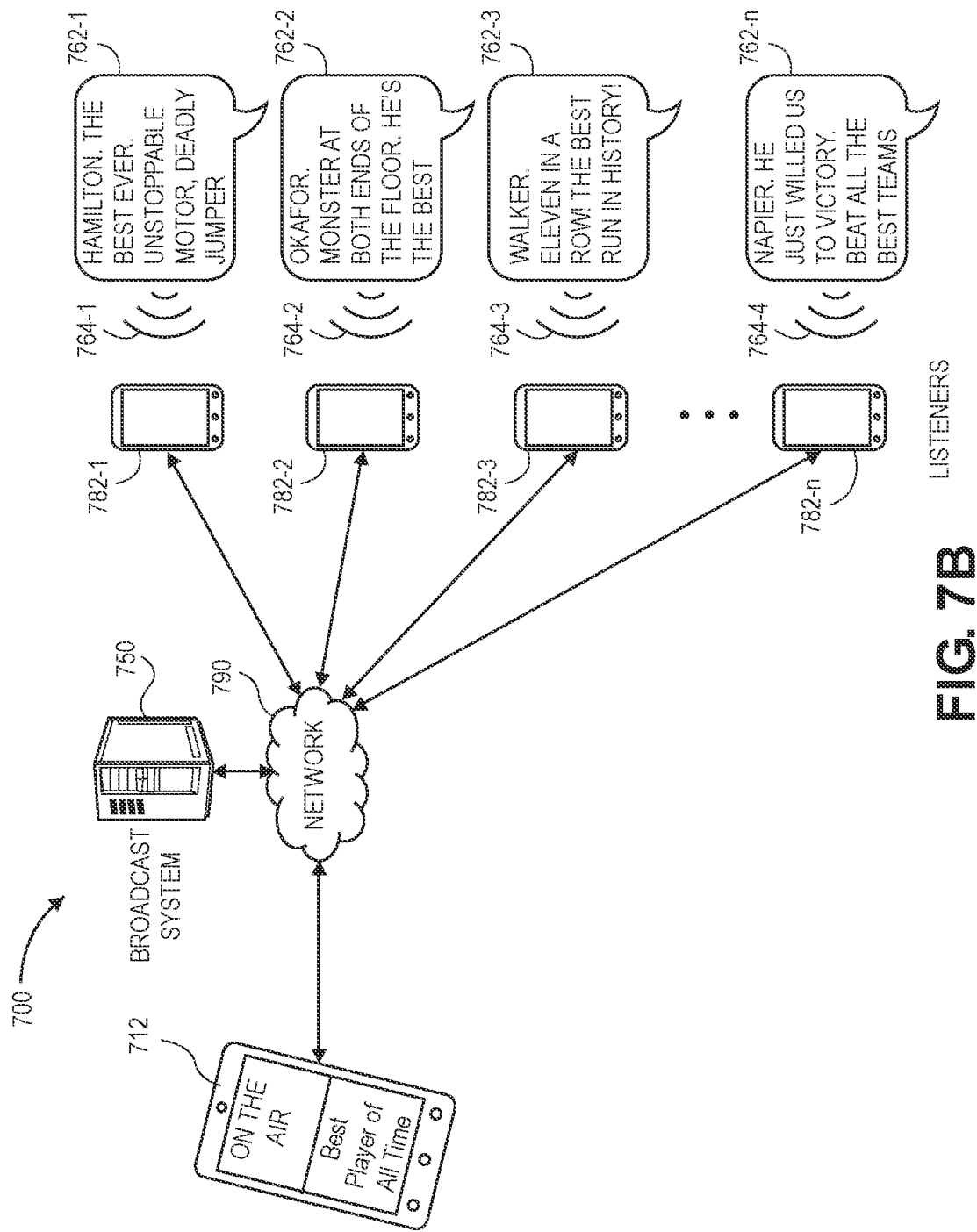

As is shown in FIG. 7B, one or more of listeners provides feedback (e.g., utterances of one or more words) 762-1, 762-2, 762-3 . . . 762-n to the computer devices 782-1, 782-2, 782-3 . . . 782-n, each of which captures audio data 764-1, 764-2, 764-3 . . . 764-n representing such feedback 762-1, 762-2, 762-3 . . . 762-n using one or more microphones or other sensors. For example, a listener to the device 782-1 responds with feedback (e.g., an utterance) 762-1, "Hamilton. The best ever. Unstoppable motor, deadly jumper." The device 782-1 captures the data 764-1 representing the voice sample 762-1, and transmits the data 764-1 any other metadata to the mobile device 712 or the broadcast system 750 over the one or more networks 790. Likewise, a listener to the device 782-2 responds with feedback 762-2, "'Okafor. Monster at both ends of the floor. He's the best." The device 782-2 captures the data 764-2 representing the feedback 762-2, and transmits the data 764-2 and any other metadata to the mobile device 712 or the broadcast system 750 over the one or more networks 790. A listener to the device 782-3 responds with feedback 762-3, "Walker. Eleven in a row! The best run in history!" The device 782-3 captures the data 764-3 representing the feedback 762-3, and transmits the data 764-3 and any other metadata to the mobile device 712 or the broadcast system 750 over the one or more networks 790. Also, a listener to the device 782-n responds with feedback 762-n, "Napier. He just willed us to victory. Beat all the best teams." The device 782-n captures the data 764-n representing the feedback 762-n, and transmits the data 764-n and any other metadata to the mobile device 712 or the broadcast system 750 over the one or more networks 790. Alternatively, or additionally, any number of the n listeners who heard the invitation may provide utterances in response to the invitation for requests or recommendations, or decline to provide any such utterances. The number n of listeners who subscribe to the media program, and receive audio signals from the creator 710 or the broadcast system 750, may be several, dozens, hundreds, thousands or more of such listeners.

Figure 7C:
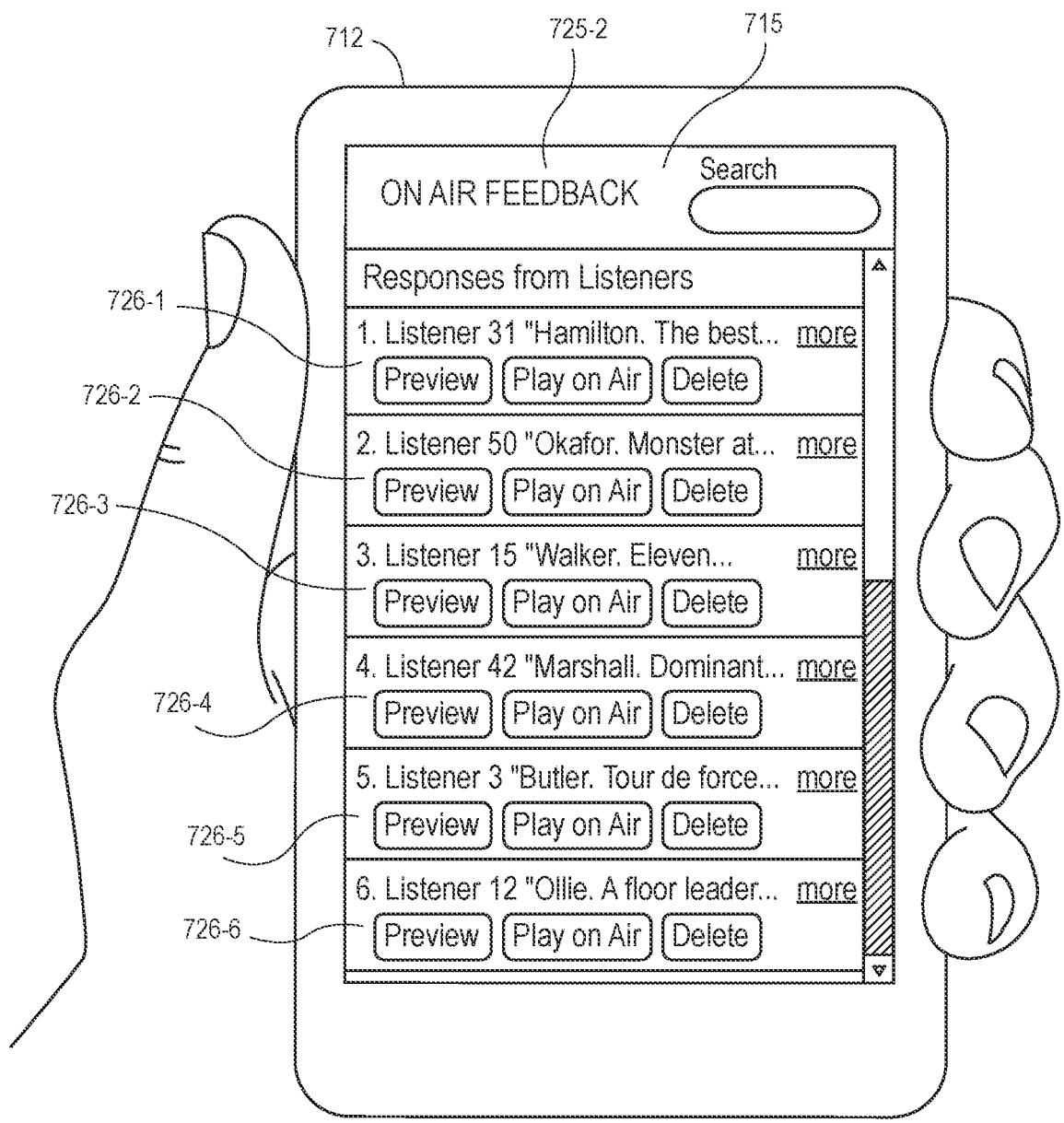

After information regarding the feedback 762-1, 762-2, 762-3 . . . 762-n is received from the devices 782-1, 782-2, 782-3 . . . 782-n, and processed to transcribe or otherwise identify words included in the feedback 762-1, 762-2, 762-3 . . . 762-n, or determine whether any of the feedback 762-1, 762-2, 762-3 . . . 762-n includes objectionable content, e.g., by a machine learning algorithm, information regarding the voice samples 762-1, 762-2, 762-3 . . . 762-n may be provided to the mobile device 712 of the creator 710 over the one or more networks 790. As is shown in FIG. 7C, a user interface 725-2 shown on the display 715 includes elements 726-1, 726-2, 726-3, 726-4, 726-5, 726-6 displaying titles (or summaries) of feedback received from listeners, identifiers of listeners that provided the feedback, one or more words (or transcripts of such words) included in the feedback received from listeners, as well as hyperlinks for viewing more words included in the feedback, or any other information regarding the feedback. The elements 726-1, 726-2, 726-3, 726-4, 726-5, 726-6 further include one or more selectable features (e.g., buttons) that may be activated to initiate one or more applications or perform one or more functions regarding feedback associated with each of the elements 726-1, 726-2, 726-3, 726-4, 726-5, 726-6.

For example, as is further shown in FIG. 7C, the elements 726-1, 726-2, 726-3, 726-4, 726-5, 726-6 include selectable features (e.g., "Preview") for previewing the feedback associated with each of the elements 726-1, 726-2, 726-3, 726-4, 726-5, 726-6, viz., playing such feedback only to the mobile device 712 of the creator 710, for his or her review. The elements 726-1, 726-2, 726-3, 726-4, 726-5, 726-6 further include selectable features (e.g., "Play on Air") for playing the feedback associated with each of the elements 726-1, 726-2, 726-3, 726-4, 726-5, 726-6 to all of the devices 782-1, 782-2, 782-3 . . . 782-$n$ that have subscribed to the media program. The elements 726-1, 726-2, 726-3, 726-4, 726-5, 726-6 further include selectable features (e.g., "Delete") for deleting the feedback associated with each of the elements 726-1, 726-2, 726-3, 726-4, 726-5, 726-6 from one or more memory components or data stores of the mobile device 712, the broadcast system 750, or any other device or system.

In some implementations, information regarding each of the voice samples 762-1, 762-2 . . . 762-$n$ received from the devices 782-1, 782-2 . . . 782-$n$ may be presented on the user interface 725-2. Alternatively, in some implementations, information regarding a subset of such voice samples, e.g., only voice samples that are confirmed to not include any objectionable content, or a subset of the voice samples defined on any other basis, may be transmitted to the mobile device 712 and represented by elements shown on the user interface 725-2.

Figure 7D:
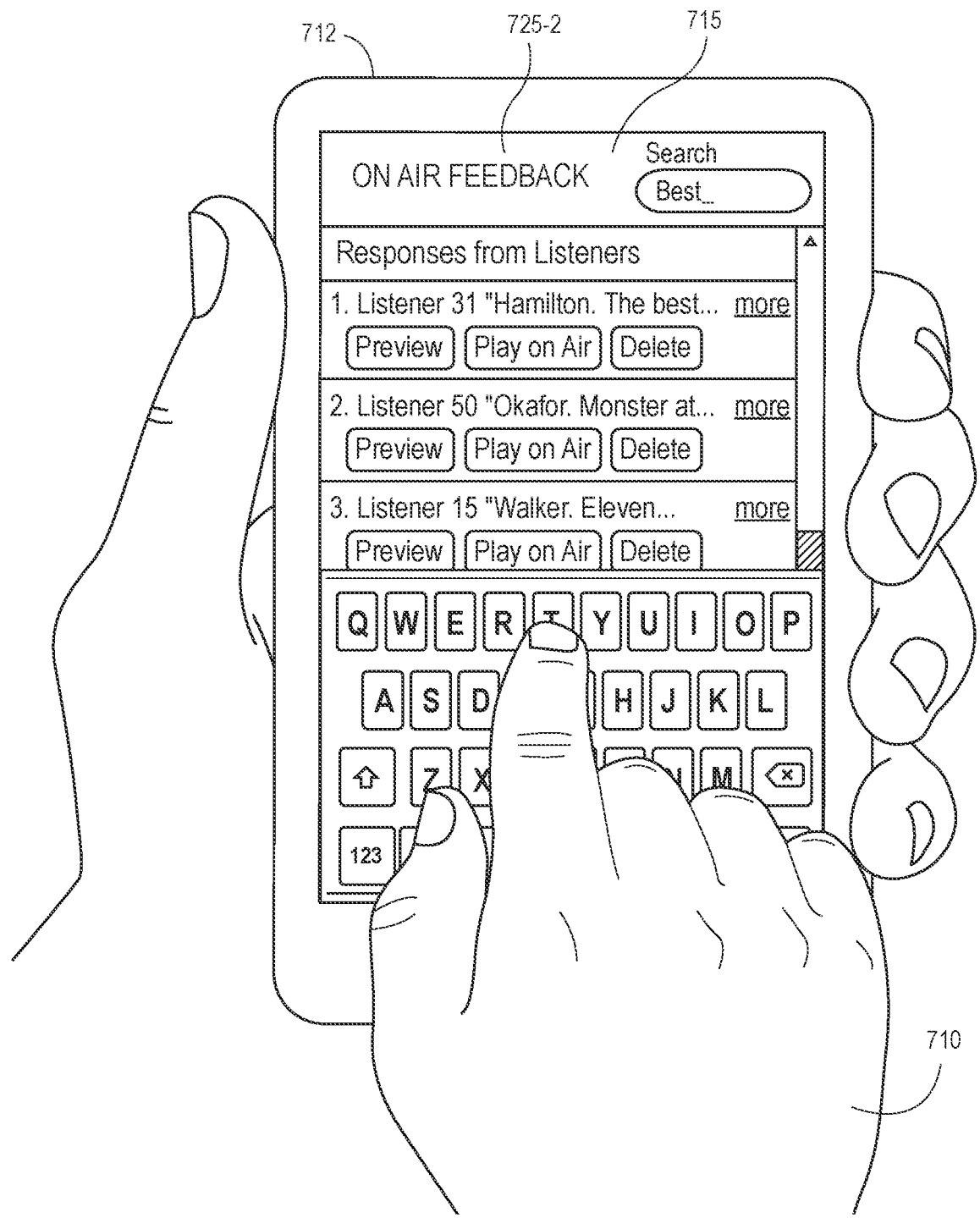

The user interface 725-2 or the elements depicted therein may include any other selectable features for initiating one or more applications or performing one or more functions regarding feedback associated with each of the elements 726-1, 726-2, 726-3, 726-4, 726-5, 726-6. For example, as is shown in FIG. 7D, the user interface 725-2 may further include one or more text boxes (or any other buttons, checkboxes, drop-down menus, list boxes, toggles, pickers, search fields, tags, sliders, icons or carousels), or any other interactive or selectable elements or features enabling the creator 710 to search for or browse through information regarding feedback (e.g., voice samples or other utterances) received from listeners. As is shown in FIG. 7D, the creator 710 may provide one or more search terms or other information, viz., the term "best," in a text box on the user interface 725-2 by executing one or more gestures or other interactions with a virtual keyboard rendered on the display 715. Alternatively, the creator 710 may provide such search terms or other information to the mobile device 712 or any other devices or systems in any other manner, e.g., by one or more voice commands or utterances, or by gestures or interactions with a drop-down menu.

Upon receiving the search terms or other information from the creator 710, the elements rendered in the user interface 725-2 may be filtered or otherwise narrowed to include only elements associated with the search terms or other information. For example, as is shown in FIG. 7E, the user interface 725-2 is narrowed to include only elements representing feedback including the term "best" entered into the text box on the user interface 725-2 as shown in FIG. 7D.

Figure 7E:
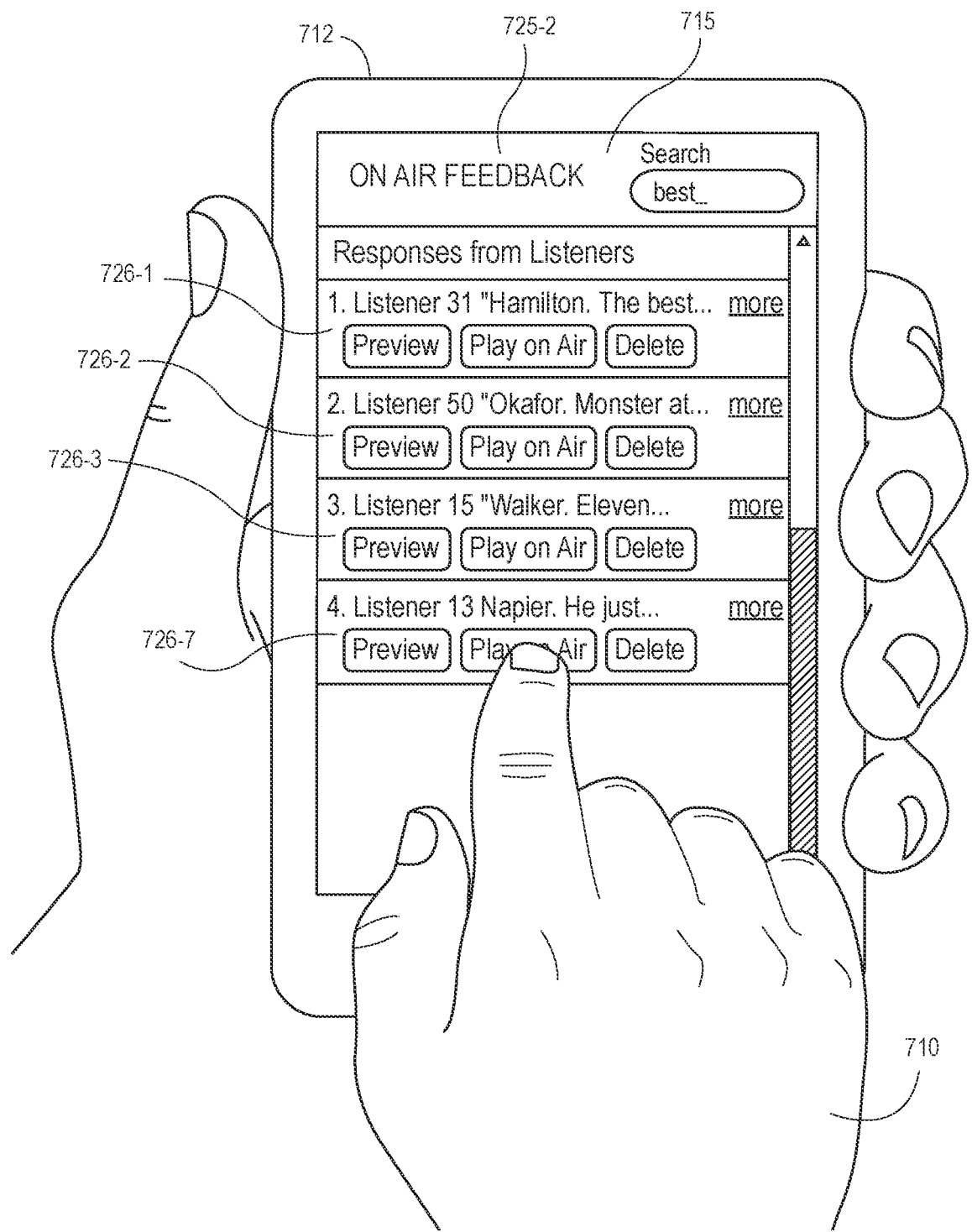

In particular, and as is shown in FIG. 7E, the user interface 725-2 includes the elements 726-1, 726-2, 726-3 that were previously shown in the user interface 725-2, and represent feedback including the term "best," but also an element 726-7 that was not previously shown in the user interface 725-2, but also represents feedback including the term "best," viz., the feedback 762-$n$ ("Napier. He just willed us to victory. Beat all the best teams").

The creator 710 may cause one or more of the sets of feedback to be transmitted to devices that subscribe to the media program, such as by executing a gesture or another interaction with a selectable feature within an element corresponding to one of the sets of feedback. For example, as is further shown in FIG. 7E, the creator 710 executes a gesture or another interaction with a selectable feature for playing the feedback 762-$n$ associated with the element 726-7, thereby causing the feedback 762-$n$ to be transmitted to each of the devices 782-1, 782-2, 782-3 . . . 782-$n$ that subscribe to the media program of the creator 710.

Figure 8:
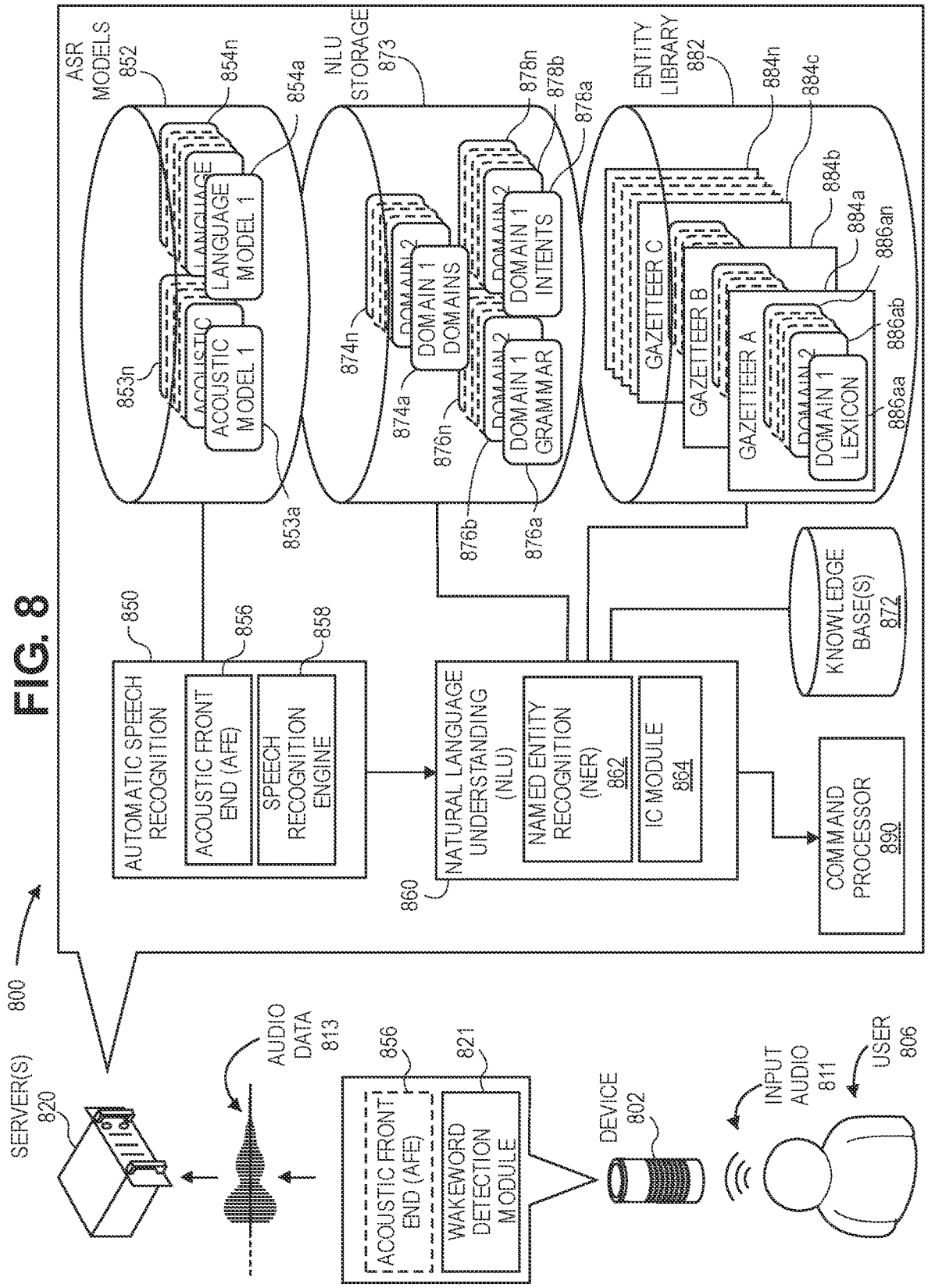
FIG. 8 is a view of aspects of one system for receiving voice samples in accordance with implementations of the present disclosure.

FIG. 8 is a conceptual diagram of how an utterance spoken by a user is processed, in order to allow a system to capture and execute commands, e.g., spoken commands that may follow a wake word. The various components shown in FIG. 8 may be located on the same physical device, or on different physical devices. Communication between various components illustrated in FIG. 8 may occur directly or across a network. An audio capture component, such as a microphone of device 802, captures audio 811 corresponding to a spoken utterance from a user 806. The device 802, using a wake word detection module 821, may then process the audio, or audio data corresponding to the audio, to determine if a keyword (such as a wake word) is detected in the audio. Following detection of a wake word, the device sends audio data 813 corresponding to the utterance to a server 820 that includes an ASR module 850. The audio data 813 may be output from an acoustic front end (AFE) 856 located on the device 802 prior to transmission. Or the audio data 813 may be in a different form for processing by a remote AFE 856, such as the AFE 856 located with the ASR module 850.

The wake word detection module 821 works in conjunction with other components of the device, for example, a microphone to detect keywords in the input audio 811. For example, the device 802 may convert input audio 811 into audio data 813, and process the audio data 813 with the wake word detection module 821 to determine whether speech is detected, and, if so, if the audio data 813 comprising speech matches an audio signature and/or model corresponding to a particular keyword.

The device 802 may use various techniques to determine whether audio data includes speech. Some implementations may apply voice activity detection (or "VAD") techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other implementations, the device 802 may implement a limited classifier configured to distinguish speech from background noise. The classifier may be implemented by techniques such as linear classifiers, support vector machines, and decision trees. In still other implementations, HMM or Gaussian Mixture Model (or "GMM") techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the input audio 811 received by the device 802 (or separately from speech detection), the device 802 may use the wake word detection module 821 to perform wake word detection to determine when a user intends to speak a command to the device 802. This process may also be referred to as keyword detection, with the wake word being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake word detection module 821 may compare audio data to stored models or data to detect a wake word. One approach for wake word detection applies general large vocabulary continuous speech recognition (or "LVCSR") systems to decode the audio signals, with wake word searching conducted in the resulting lattices or confusion networks. LVCSR decoding may require relatively high computational resources. Another approach for wake word spotting builds HMMs for each key wake word and non-wake word speech signals, respectively. The non-wake word speech includes other spoken words, background noise, etc. There can be one or more HMMs built to model the non-wake word speech characteristics, which are named filler models. Viterbi decoding is used to search the best path in the decoding graph, and the decoding output is further processed to make the decision on keyword presence. This approach can be extended to include discriminative information by incorporating hybrid deep neural network (or "DNN")-HMM decoding framework. In another implementation, the wake word spotting system may be built on DNN or recursive neural network (or "RNN") structures directly, without HMM involved. Such a system may estimate the posteriors of wake words with context information, either by stacking frames within a context window for DNN, or using RNN. Following-on, posterior threshold tuning or smoothing is applied for decision making. Other techniques for wake word detection, such as those known in the art, may also be used.

Once the wake word is detected, the local device 802 may "wake" and begin transmitting audio data 813 corresponding to input audio 811 to the server(s) 820 for speech processing. Audio data 813 corresponding to the input audio 811 may be sent to a server 820 for routing to a recipient device or may be sent to the server for speech processing for interpretation of the included speech (e.g., for purposes of executing a command in the speech, or for other purposes). The audio data 813 may include data corresponding to the wake word, or the portion of the audio data corresponding to the wake word may be removed by the local device 802 prior to sending. Further, a local device 802 may "wake" upon detection of speech or spoken audio above a threshold. Upon receipt by the server(s) 820, an automatic speech recognition (or "ASR") module 850 may convert the audio data 813 into text. The ASR module 850 transcribes audio data into text data representing the words of the speech contained in the audio data. The text data may then be used by other components for various purposes, such as executing system commands, inputting data, etc. A spoken utterance in the audio data is input to a processor configured to perform ASR, which then interprets the utterance based on the similarity between the utterance and pre-established language models 854a-854n stored in an ASR model knowledge base (ASR Models Storage 852). For example, an ASR process may compare the input audio data with models for sounds (e.g., sub-word units or phonemes) and sequences of sounds to identify words that match the sequence of sounds spoken in the utterance of the audio data.

The different ways in which a spoken utterance may be interpreted (e.g., different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853a-853n stored in an ASR Models Storage 852), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR module 850 outputs the most likely text recognized in the audio data. The ASR module 850 may also output multiple hypotheses in the form of a lattice or an N-best list with each hypothesis corresponding to a confidence score or other score (such as probability scores, etc.).

The device or devices performing ASR processing may include an acoustic front end (or "AFE") 856 and a speech recognition engine 858. The acoustic front end (AFE) 856 transforms the audio data from the microphone into data for processing by the speech recognition engine. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features or qualities of the audio data within the frame. Many different features may be determined, as known in the art, and each feature represents some quality of the audio that may be useful for ASR processing. A number of approaches may be used by the AFE 856 to process the audio data, such as MFCC or PLP techniques, neural network feature vector techniques, linear discriminant analysis, semi-tied covariance matrices, or other approaches known to those of skill in the art.

The speech recognition engine 858 may process the output from the AFE 856 with reference to information stored in speech or model storage (852). Alternatively, post front-end processed data (such as feature vectors) may be received by the device executing ASR processing from another source besides the internal AFE. For example, the device 802 may process audio data into feature vectors (for example using an on-device AFE 856) and transmit that information to a server across a network for ASR processing. Feature vectors may arrive at the server encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that an ASR process will output speech results that make sense grammatically. The specific models used may be general models or may be models corresponding to a particular domain, such as music, banking, etc.

The speech recognition engine 858 may use a number of techniques to match feature vectors to phonemes, for example using HMMs to determine probabilities that feature vectors may match phonemes. Sounds received may be represented as paths between states of an HMI and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc., may be sent to a server, such as server 820, for NLU processing, such as conversion of the text into commands for execution, either by the device 802, by the server 820, or by another device (such as a server running a specific application like a search engine, etc.).

A device performing NLU processing 860 (e.g., server 820) may include various components, including potentially dedicated processor(s), memory, storage, etc. As shown in FIG. 8, an NLU component may include a named entity recognition (or "NER") module 862 which is used to identify portions of query text that correspond to a named entity that may be recognizable by the system. A downstream process called named entity resolution actually links a text portion to an actual specific entity known to the system. To perform named entity resolution, the system may utilize gazetteer information (884a, 884b, 884c . . . 884n) stored in entity library storage 882. The gazetteer information may be used for entity resolution, for example matching ASR results with different entities (such as song titles, user names, etc.). Gazetteers may be linked to users (for example, a particular gazetteer may be associated with a specific user's list or collection of other user contacts), may be linked to certain domains (such as communication), or may be organized in a variety of other ways.

Generally, a NLU process takes textual input (such as processed from ASR 850 based on the utterance input audio 811) and attempts to make a semantic interpretation of the text. That is, a NLU process determines the meaning behind the text based on the individual words and then implements that meaning. NLU processing 860 interprets a text string to derive an intent or a desired action from the user as well as the pertinent pieces of information in the text that allow a device (e.g., device 802) or other service, such as a music service, to complete that action. For example, if a spoken utterance is processed using ASR 850 and outputs the text "Let me hear a song from Foo Fighters," the NLU process may determine that the user intended to initiate a music session using the device 802 and to hear music matching the entity "Foo Fighters" (which may involve a downstream command processor 890 linked with a communication session application).

A NLU may process several textual inputs related to the same utterance. For example, if the ASR 850 outputs N text segments (as part of an N-best list), the NLU may process all N outputs to obtain NLU results.

A NLU process may be configured to parse and tag or otherwise annotate text as part of NLU processing. For example, for the text "Play some Macklemore," "play" may be tagged as a command (to begin the presentation of music or other media) and "Macklemore" may be tagged as a specific entity and target of the command (and an identifier of an entity corresponding to "Macklemore" may be included in the annotated result). For the text "Call Mom," "call" may be tagged as a command (e.g., to execute a phone call), and "Mom" may be tagged as a specific entity and target of the command (and an identifier of an entity corresponding to "Mom" may be included in the annotated result). Further, the NLU process may be used to provide answer data in response to queries, for example, using the knowledge base 872.

To correctly perform NLU processing of speech input, an NLU process 860 may be configured to determine a "domain" of the utterance so as to determine and narrow down which services offered by the endpoint device (e.g., server 820 or device 802) may be relevant. For example, an endpoint device may offer services relating to interactions with a communication service, a contact list service, a calendar/scheduling service, a music player service, etc. Words in a single text query may implicate more than one service, and some services may be functionally linked (e.g., both a communication service and a calendar service may utilize data from the contact list).

The name entity recognition (or "NER") module 862 receives a query in the form of ASR results and attempts to identify relevant grammars and lexical information that may be used to construe meaning. To do so, the NER module 862 may begin by identifying potential domains that may relate to the received query. The NLU storage 873 includes a database of devices (874a-874n) identifying domains associated with specific devices. For example, the device 802 may be associated with domains for music, communication sessions, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "music," "communication session," "shopping," "calendaring," etc. As such, each domain may be associated with a particular language model and/or grammar database (876a, 876b . . . 876n), a particular set of intents/actions (878a, 878b-878n), and a particular personalized lexicon (886). Each gazetteer (884a-884n) may include domain-indexed lexical information associated with a particular user and/or device. For example, the Gazetteer A (884a) includes domain-index lexical information 886aa, 886ab-886an. A user's music-domain lexical information might include album titles, artist names, and song names, for example, whereas a user's contact-list lexical information might include the names of contacts, identifiers for devices associated with those contacts, device characteristics, etc. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (or "IC") module 864 parses the query to determine an intent or intents for each identified domain, wherein the intent corresponds to the action to be performed that is responsive to the query. Each domain is associated with a particular set of intents/actions (678a-678n) of words linked to intents. For example, a music intent may link words and phrases such as "quiet," "volume off," and "mute" to a "mute" intent. The IC module 864 identifies potential intents for each identified domain by comparing words in the query to the words and phrases in the set of intents actions 878 for that domain. Traditionally, the determination of an intent by the IC module is performed using a set of rules or templates that are processed against the incoming text to identify a matching intent.

In order to generate a particular interpreted response, the NER 862 applies the grammar models and lexical information associated with the respective domain to actually recognize and mention one or more entities in the text of the query. In this manner, the NER 862 identifies "slots" (i.e., particular words in query text) that may be needed for later command processing. Depending on the complexity of the NER 862, it may also label each slot with a type of varying levels of specificity (such as noun, place, city, artist name, song name, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with a music domain, a communication session domain or a shopping domain may include a database of words commonly used when people discuss music, communication sessions or shopping, respectively, and/or constraints to include with music, communication sessions or shopping, respectively.

The intents identified by the IC module 864 are linked to domain-specific grammar frameworks (included in 876) with "slots" or "fields" to be filled. Each slot or field corresponds to a portion of the query text that the system believes corresponds to an entity. For example, if "Play music" is an identified intent, a grammar framework or frameworks 876 may correspond to sentence structures such as "Play {Artist Name}," "Play {Album Name}," "Play {Song Name}," "Play {Song Name} by {Artist Name}," etc. However, to make resolution more flexible, these frameworks would ordinarily not be structured as sentences, but rather based on associating slots with grammatical tags.

For example, the NER module 862 may parse the query to identify words as subject, object, verb, preposition, etc., based on grammar rules and/or models, prior to recognizing named entities. The identified verb may be used by the IC module 864 to identify intent, which is then used by the NER module 862 to identify frameworks. A framework for an intent of "play" may specify a list of slots or fields applicable to play the identified "object" and any object modifier (e.g., a prepositional phrase), such as {Artist Name}, {Album Name}, {Song name}, etc. The NER module 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type or semantic meaning. Parsing may be performed using heuristic grammar rules, or an NER model may be constructed using techniques such as HMM, maximum entropy models, log linear models, conditional random fields (CRF), and the like.

For instance, a query of "play Man in the Box by Alice in Chains" might be parsed and tagged as {Verb}: "Play," {Object}: "Man in the Box," {Object Preposition}: "by," and {Object Modifier}: "Alice in Chains." At this point in the process, "Play" may be identified as a verb based on a word database associated with the music domain, which the IC module 864 will determine corresponds to the "play music" intent. Even if no determination has been made as to the meaning of "Man in the Box" and "Alice in Chains," but, based on grammar rules and models, it may be determined that the text of these phrases relates to the grammatical objects (i.e., entity) of the query.

The frameworks linked to the intent are then used to determine what database fields should be searched to determine the meaning of these phrases, such as searching a user's gazetteer for similarity with the framework slots. A framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot or field using gazetteer information, the NER module 862 may search the database of generic words associated with the domain (in the storage 873). For example, if a query was "play songs by Heart," after failing to determine an album name or song name called "songs" by "Heart," the NER module 862 may search the domain vocabulary for the word "songs." In the alternative, generic words may be checked before the gazetteer information, or both may be tried, potentially producing two different results.

The comparison process used by the NER module 862 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 862 may also use contextual operational rules to fill slots. For example, if a user had previously requested to pause a particular song and thereafter requested that the voice-controlled device to "please un-pause my music," the NER module 862 may apply an inference-based rule to fill a slot associated with the name of the song that the user currently wishes to play, namely, a song that was playing at the time that the user requested to pause the music.

The results of NLU processing may be tagged to attribute meaning to the query. So, for instance, "play Long Road by Pearl Jam" might produce a result of: {domain} Music, {intent} Play Music, {artist name} "Pearl Jam," {media type} song, and {song title} "Long Road." As another example, "play songs by Pearl Jam" might produce: {domain} Music, {intent} Play Music, {artist name} "Pearl Jam," and {media type} song.

The output from the NLU processing (which may include tagged text, commands, etc.) may then be sent to a command processor 890, which may be located on a same or separate server 820 as part of system 800. The destination command processor 890 may be determined based on the NLU output. For example, if the NLU output includes a command to play music, or to establish a communication session, the destination command processor 890 may be a music application or a communication application, such as one located on device 802 or in another device associated with the user.

Figure 9:
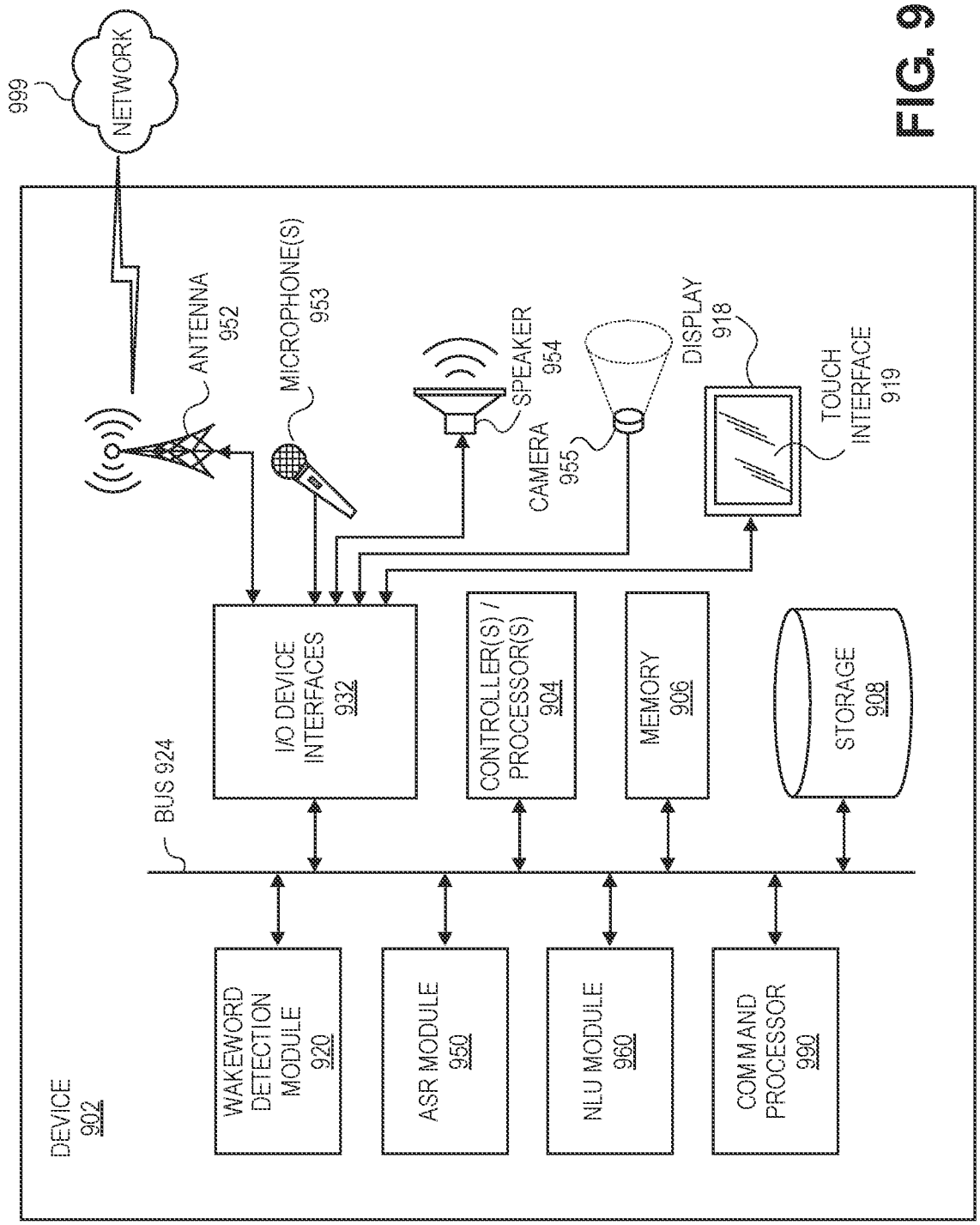
FIG. 9 is a view of aspects of one system for receiving voice samples in accordance with implementations of the present disclosure.
Figure 10:
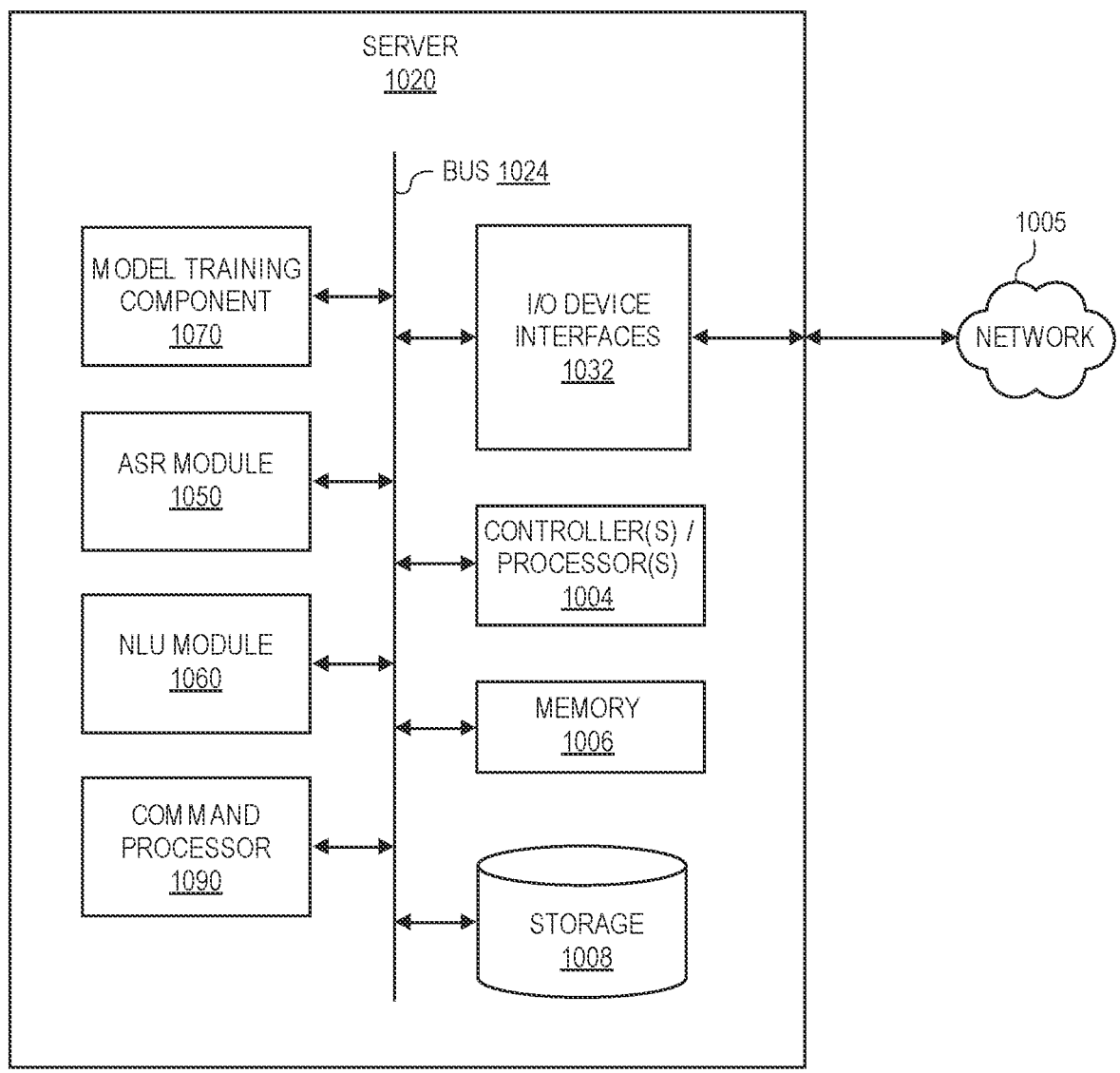
FIG. 10 is a view of aspects of one system for receiving voice samples in accordance with implementations of the present disclosure.

FIG. 9 is a block diagram conceptually illustrating a local device 902 that may be used with the described system. FIG. 10 is a block diagram conceptually illustrating example components of a remote device, such as a remote server 1020 that may assist with ASR, NLU processing, or command processing. Multiple such servers 1020 may be included in the system, such as one server(s) 1020 for training ASR models, one server(s) for performing ASR, one server(s) 1020 for performing NLU, etc. In operation, each of these devices (or groups of devices) may include computer-readable and computer-executable instructions that reside on the respective device 902/1020, as will be discussed further below.

Each of these devices 902/1020 may include one or more controllers/processors 904/1004, that may each include a central processing unit (or "CPU") for processing data and computer-readable instructions, and a memory 906/1006 for storing data and instructions of the respective device. The memories 906/1006 may individually include volatile random access memory (RAM), non-volatile read only memory (ROM), non-volatile magnetoresistive (MRAM) and/or other types of memory. Each device may also include a data storage component 908/1008, for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 932/1032.

Computer instructions for operating each device 902/1020 and its various components may be executed by the respective device's controller(s)/processor(s) 904/1004, using the memory 906/1006 as temporary "working" storage at runtime. A device's computer instructions may be stored in a non-transitory manner in non-volatile memory 906/1006, storage 908/1008, or an external device(s). Alternatively, some or all of the executable instructions may be embedded in hardware or firmware on the respective device in addition to or instead of software.

Each device 902/1020 includes input/output device interfaces 932/1032. A variety of components may be connected through the input/output device interfaces, as will be discussed further below. Additionally, each device 902/1020 may include an address/data bus 924/1024 for conveying data among components of the respective device. Each component within a device 902/1020 may also be directly connected to other components in addition to (or instead of) being connected to other components across the bus 924/1024.

Referring to the device 902 of FIG. 9, the device 902 may include a display 918, which may comprise a touch interface 919. Alternatively, the device 902 may be "headless" and may primarily rely on spoken commands for input. As a way of indicating to a user that a connection between another device has been opened, relay constraint notification, etc., the device 902 may be configured with a visual indicator, such as an LED or similar illumination element, that may change color, flash, or otherwise provide visual indications by the device 902. The device 902 may also include input/output device interfaces 932 that connect to a variety of components such as an audio output component such as a speaker 954, an imaging device such as a camera 955, a wired headset or a wireless headset, and/or other components capable of outputting audio. The device 902 may also include an audio capture component. The audio capture component may be, for example, a microphone 953 or array of microphones, a wired headset or a wireless headset, etc. The microphone 953 may be configured to capture audio, such as phrases or utterances from a user. If an array of microphones is included, approximate distance to a sound's point of origin may be determined using, for example, acoustic localization based on time and amplitude differences between sounds captured by different microphones of the array. The device 902 (using microphone 953, wake word detection module 920, ASR module 950, etc.) may be configured to determine audio data corresponding to detected audio data. The device 902 (using input/output device interfaces 932, antenna 952, etc.) may also be configured to transmit the audio data to server 1020 for further processing or to process the data using internal components such as a wake word detection module 920.

For example, via the antenna(s), the input/output device interfaces 932 may connect to one or more networks 999/1005 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 5G network, etc. A wired connection such as Ethernet may also be supported. Through the network(s) 999/1005, the speech processing system may be distributed across a networked environment.

The device 902 and/or server 1020 may include an ASR module 950/1050. The ASR module 950 in device 902 may be of limited or extended capabilities or may not be included in the device 902. The ASR module(s) may include the language models stored in the ASR model storage component, and perform the automatic speech recognition process. If limited speech recognition is included on the device 902, the ASR module 950 may be configured to identify a limited number of words, such as keywords detected by the device, whereas extended speech recognition may be configured to recognize a much larger range of words.

The device 902 and/or server 1020 may include a limited or extended NLU module 960/1060. The NLU module in device 902 may be of limited or extended capabilities, or may not be included on the device 902. The NLU module(s) may comprise the name entity recognition module, the intent classification module and/or other components, as discussed above. The NLU module(s) may also include a stored knowledge base and/or entity library, or those storages may be separately located.

The device 902 and/or server 1020 may also include a command processor 990/1090 that is configured to execute commands/functions associated with a spoken command as described above.

The device 902 may include a wake word detection module 920, which may be a separate component or may be included in an ASR module 950. The wake word detection module 920 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some implementations, the device 902 may be configured collectively to identify a set of the directional audio signals in which the wake expression is detected or in which the wake expression is likely to have occurred.

The wake word detection module 920 receives captured audio and processes the audio to determine whether the audio corresponds to particular keywords recognizable by the device 902 and/or system. The storage 908 may store data relating to keywords and functions to enable the wake word detection module 920 to perform the algorithms and methods described above. The locally stored speech models may be pre-configured based on known information, prior to the device 902 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 902 prior to the user device 902 being delivered to the user or configured to access the network by the user. The wake word detection module 920 may access the storage 908 and compare the captured audio to the stored models and audio sequences using audio comparison, pattern recognition, keyword spotting, audio signature, and/or other audio processing techniques.

The server may include a model training component 1070. The model training component may be used to train the classifiers or models discussed above.

As noted above, multiple devices may be employed in a single speech processing system. In such a multi-device system, each of the devices may include different components for performing different aspects of the speech processing. The multiple devices may include overlapping components. The components of the devices 902 and server 1020, as illustrated in FIGS. 9 and 10, are exemplary, and may be located as a stand-alone device or may be included, in whole or in part, as a component of a larger device or system. Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 4 and 6, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A broadcast system comprising:
   a first computer system having at least a first data store and at least a first computer processor, wherein the first computer system is connected to one or more networks, and
   wherein the first data store has one or more sets of instructions stored thereon that, when executed by at least the first computer processor, cause the first computer system to perform a method comprising:
      receiving a plurality of sets of data over the one or more networks, wherein each of the sets of data is received from one of a plurality of computer systems of listeners to a media program, wherein each of the sets of data represents one of a plurality of voice samples provided by one of a plurality of listeners to the media program;
      identifying a first set of text included in a first voice sample of a first listener, wherein the first voice sample is represented by a first set of data of the plurality of sets of data, and wherein the first listener is one of the plurality of listeners;
      determining that the first set of text does not include objectionable content;
      storing at least the first set of data in association with a first title of the first voice sample in the first data store, wherein the first title comprises at least a portion of the first set of text;
      causing a display of a user interface by a second computer system associated with a creator of the media program, wherein the user interface comprises:
         a first identifier of the first listener;
         the first title;
         a first selectable feature, wherein the first selectable feature is configured to cause at least a portion of the first voice sample to be played by each of the plurality of computer systems;
      receiving an instruction from the second computer system, wherein the instruction is transmitted by the second computer system to the first computer system in response to a selection of the first selectable feature by the creator; and
      in response to the instruction,
         causing at least the portion of the first voice sample to be played by each of the plurality of computer systems.

2. The broadcast system of claim 1, wherein the method further comprises:
   receiving a second set of data from the second computer system, wherein the second set of data represents a second voice sample of the creator, and wherein the second voice sample comprises a request for voice samples from the plurality of listeners; and
   causing at least a portion of the second voice sample to be played by each of the plurality of computer systems,
   wherein each of the plurality of sets of data is received from one of the plurality of computer systems after at least the portion of the second voice sample is played by the one of the plurality of computer systems, and
   wherein the user interface comprises:
      a plurality of identifiers, wherein each of the plurality of identifiers identifies one of the plurality of listeners, and wherein the first identifier is one of the plurality of identifiers;
      a plurality of titles, wherein each of the titles is a title of one of the plurality of voice samples, and wherein the first title is one of the plurality of titles; and
      a plurality of selectable features, wherein each of the plurality of selectable features is configured to cause at least a portion of one of the voice samples to be played by each of the plurality of computer systems, and wherein the first selectable feature is one of the plurality of selectable features.

3. The broadcast system of claim 1, wherein the method further comprises:
   providing at least the first set of data to a speech recognition engine as an input;
   receiving at least one output from the speech recognition engine in response to the input; and
   identifying the first set of text based at least in part on the at least one output.

4. The broadcast system of claim 1, wherein the method further comprises:
   identifying a second set of text, wherein the second set of text comprises a plurality of words, and wherein each of the plurality of words is determined to be objectionable; and
   determining that the first set of text does not include any of the plurality of words,
   wherein at least the first set of data is stored in association with the first title of the first voice sample in the first data store in response to determining that the first set of text does not include any of the plurality of words.

5. A computer-implemented method comprising:
   transmitting, by a first computer system to at least a second computer system, first media content of a first media program;
   receiving, by the first computer system from the second computer system, a first set of data representing at least a first utterance by a user of the second computer system;
   providing, by the first computer system, at least a portion of the first set of data to a machine learning algorithm as an input, wherein the machine learning algorithm is trained to identify at least one word represented in audio data;

determining, by the first computer system, at least a first set of words included in the first utterance based at least in part on at least one output received from the machine learning algorithm in response to the input;

causing, by the first computer system, information regarding at least the first utterance to be displayed by a third computer system associated with a creator of the first media program;

receiving, by the first computer system from the third computer system, a selection of second media content to be included in the first media program, wherein the selection is made by the creator of the first media program; and in response to receiving the selection of the second media content,
transmitting, to at least the second computer system, a second set of data representing at least the second media content.

6. The computer-implemented method of claim 5, wherein the second media content comprises:
at least a portion of the first set of words included in the first utterance;
a second utterance of the creator; or
at least one of a song or a podcast identified based at least in part on the first set of words.

7. The computer-implemented method of claim 5, wherein the second computer device is at least a portion of one of:
an automobile;
a desktop computer;
a laptop computer;
a media player;
a smartphone;
a smart speaker;
a tablet computer; or
a wristwatch.

8. The computer-implemented method of claim 5, wherein determining at least the first set of words included in the first utterance comprises:
providing at least a portion of the first set of data as an input to at least one machine learning algorithm operated by the first computer system, wherein the at least one machine learning algorithm is trained to recognize speech;
receiving an output from the at least one machine learning algorithm in response to the input; and
identifying at least the first set of words based at least in part on the output.

9. The computer-implemented method of claim 5, further comprising:
identifying, by the first computer system, a second set of words, wherein each of the second set of words has been designated as objectionable;
determining, by the first computer system, that the first set of words does not include any of the second set of words; and
in response to determining that the first set of words does not include any of the second set of words,
determining, by the first computer system, that the first utterance does not include objectionable content, wherein the information regarding at least the first utterance is caused to be displayed by the third computer system in response to determining that the first utterance does not include objectionable content.

10. The computer-implemented method of claim 9, further comprising:
providing at least a portion of the first set of words as an input to at least one machine learning algorithm operated by the first computer system, wherein the at least one machine learning algorithm is trained to identify a sentiment within speech;
receiving an output from the at least one machine learning algorithm in response to the input; and
determining a sentiment of the first utterance based at least in part on the output,
wherein that the first utterance does not include objectionable content is determined based at least in part on the sentiment of the first utterance.

11. The computer-implemented method of claim 9, further comprising:
receiving, by the first computer system from a fourth computer system, a third set of data representing at least a second utterance by a user of the fourth computer system;
determining, by the first computer system, at least a third set of words included in the second utterance; and
determining, by the first computer system, that the third set of words includes at least one of the second set of words,
wherein information regarding at least the second utterance is not caused to be displayed by the third computer system.

12. The computer-implemented method of claim 5, further comprising:
selecting a title of the first utterance based at least in part on at least some of the first set of words; and
storing the first set of data in association with the title of the first utterance in at least one data store,
wherein causing the information regarding at least the first utterance to be displayed by the third computer system comprises:
transmitting, by the first computer system to the third computer system, code for rendering at least one user interface on a display of the third computer system,
wherein the at least one user interface comprises the information regarding at least the first utterance and at least one selectable element for causing at least the second set of data to be transmitted to at least the second computer system, and
wherein the selection of the second media content is a selection of the at least one selectable element.

13. The computer-implemented method of claim 5, further comprising:
determining that at least some of the first set of words comprises a request by the user to communicate with the creator,
wherein causing the information regarding at least the first utterance to be displayed by the third computer system comprises:
in response to determining that the at least some of the first set of words comprises the request by the user to communicate with the creator,
transmitting, by the first computer system to the third computer system, code for rendering at least one user interface on a display of the third computer system, wherein the at least one user interface comprises the information regarding at least the first utterance and at least one selectable element for establishing a two-way connection between the first computer system and the second computer system, and wherein the selection of the second media content is a selection of the at least one selectable element; and
in response to the selection of the at least one selectable element,
establishing the two-way connection between the first computer system and the second computer system; and
receiving, by the first computer system from the second computer system, at least the second set of data via the two-way connection between the first computer system and the second computer system.

14. The computer-implemented method of claim 5, further comprising:
determining, by the first computer system, that the first set of words identifies at least one of a title or an artist associated with a song, wherein the second media content comprises the song, and wherein the second set of data comprises the media file; and
identifying, by the first computer system, a fourth computer system having at least the media file stored thereon,
wherein causing the information regarding at least the first utterance to be displayed by the third computer system comprises:
transmitting, by the first computer system to the third computer system, code for rendering at least one user interface on a display of the third computer system, wherein the at least one user interface comprises the information regarding at least the first utterance and at least one selectable element for causing at least the second set of data to be transmitted by the fourth computer system to at least the second computer system, and
wherein the selection of the second media content is a selection of the at least one selectable element.

15. The computer-implemented method of claim 5, wherein the third computer system is a mobile device comprising:
at least one microphone;
an interactive display; and
at least one speaker, and
wherein the first media content comprises at least a second utterance of the creator received via the at least one microphone,
wherein the second utterance includes an invitation to provide media content to be included in the media program, and
wherein the selection of the second media content is received following at least a first interaction by the creator with the interactive display.

16. The computer-implemented method of claim 5, wherein the second computer system is one of a plurality of computer systems associated with listeners to the media program, and
wherein the computer-implemented method further comprises:
establishing, by the first computer system, a plurality of channels, wherein each of the plurality of channels is a one-directional connection between the first computer system and one of the plurality of computer systems; and
transmitting, by the first computer system to each of the plurality of computer systems, at least the first media content.

17. The computer-implemented method of claim 5, wherein the first media content comprises at least one of:
an advertisement;
music;
a news program;
a sports program; or
a weather report.

18. A first computer system having at least a first data store and at least a first computer processor, wherein the first computer system is connected to one or more networks, and
wherein the first data store has one or more sets of instructions stored thereon that, when executed by at least the first computer processor, cause the first computer system to perform a method comprising:
transmitting a first set of data to each of a plurality of computer systems over the one or more networks, wherein the first set of data represents a first voice sample of a creator of a media program, and wherein each of the plurality of computer systems is associated with one of a plurality of subscribers to the media program;
receiving a plurality of sets of data from at least some of the plurality of computer systems over the one or more networks, wherein each of the plurality of sets of data represents one of a plurality of voice samples provided by one of the plurality of subscribers to the media program;
identifying a plurality of sets of text, wherein each of the plurality of sets of text includes at least one word spoken in one of the plurality of voice samples;
determining that at least a subset of the plurality of voice samples do not include objectionable content based at least in part on the plurality of sets of text;
causing a display of a user interface by a second computer system associated with the creator of the media program, wherein the user interface comprises a plurality of elements, and wherein each of the plurality of elements represents one of the voice samples and comprises:
a title of the one of the plurality of voice samples; and
an identifier of a subscriber that provided the one of the plurality of voice samples;
receiving an instruction from the second computer system over the one or more networks, wherein the instruction is transmitted by the second computer system to the first computer system in response to a selection of at least a portion of one of the plurality of elements by the creator; and
in response to the instruction,
causing at least the portion of the voice sample represented by the one of the plurality of elements having the portion selected by the creator to be played by each of the plurality of computer systems.

19. The first computer system of claim 18, wherein determining that at least the subset of the plurality of voice samples do not include objectionable content based at least in part on the plurality of sets of text comprises:
providing each of the plurality of sets of data as inputs to a machine learning algorithm executed by the first computer system;
receiving a plurality of outputs from the machine learning algorithm, wherein each of the plurality of outputs is generated by the machine learning algorithm in response to one of the inputs;
determining sentiments of each of the plurality of voice samples, wherein each of the sentiments is determined based at least in part on one of the plurality of outputs, wherein that at least the subset of the plurality of voice samples do not include objectionable content is determined based at least in part on the plurality of sets of text and the sentiments.

20. The first computer system of claim 18, wherein the second computer system is a mobile device comprising:
- at least one microphone;
- an interactive display; and
- at least one speaker, and
- wherein the first voice sample is received from the creator via the at least one microphone, and
- wherein the selection of at least the portion of the one of the plurality of elements is received following at least an interaction by the creator with the interactive display.

\* \* \* \* \*